United States Patent
Katoh et al.

(10) Patent No.: US 9,262,720 B2
(45) Date of Patent: *Feb. 16, 2016

(54) COMPUTER-READABLE RECORDING MEDIUM, EXTRACTING DEVICE, AND EXTRACTING METHOD

(71) Applicant: FUJITSU LIMITED, Kawasaki-shi, Kanagawa (JP)

(72) Inventors: Takashi Katoh, Yokohama (JP); Shinichiro Tago, Shinagawa (JP); Tatsuya Asai, Kawasaki (JP); Hiroaki Morikawa, Kawasaki (JP); Hiroya Inakoshi, Tama (JP); Nobuhiro Yugami, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 229 days.

This patent is subject to a terminal disclaimer.

(21) Appl. No.: 14/037,446

(22) Filed: Sep. 26, 2013

(65) Prior Publication Data
US 2014/0114900 A1    Apr. 24, 2014

(30) Foreign Application Priority Data
Oct. 19, 2012   (JP) .............................. 2012-232295

(51) Int. Cl.
*G06F 17/00*   (2006.01)
*G06N 5/02*    (2006.01)
*G06N 5/04*    (2006.01)
(Continued)

(52) U.S. Cl.
CPC ............... *G06N 5/047* (2013.01); *G06F 17/30* (2013.01); *G06N 5/04* (2013.01); *H04N 21/8541* (2013.01)

(58) Field of Classification Search
USPC .......................................................... 706/48
See application file for complete search history.

(56) References Cited

U.S. PATENT DOCUMENTS 6,523,044 B1 *   2/2003   Muramoto ........ G06F 17/30386
8,041,721 B2    10/2011   Tago
8,122,025 B2    2/2012   Ando et al.
(Continued)

FOREIGN PATENT DOCUMENTS

JP    04-125734    4/1992
JP    08-6957      1/1996
(Continued)

OTHER PUBLICATIONS

Unsupervised Consensus Clustering of Acoustic Emission Time-Series for Robust Damage Sequence Estimation in Composites Ramasso, E.; Placet, V.; Boubakar, M.L. Instrumentation and Measurement, IEEE Transactions on Year: 2015, vol. 64, Issue: 12 pp. 3297-3307, DOI: 10.1109/TIM.2015.2450354.*

(Continued)

*Primary Examiner* — Michael B Holmes
(74) *Attorney, Agent, or Firm* — Fujitsu Patent Center

(57) ABSTRACT

According to one aspect, a computer-readable recording medium stores therein an extracting program 330a causing a computer to execute a process. The process includes based on event data obtained by associating a plurality of events stored in a storage unit and an occurrence time of each event, sequentially adding an event to a first pattern obtained by associating the plurality of events and the occurrence order of each event, and sequentially generating a second pattern which includes the first pattern and occurs in the event data; and extracting a pattern which satisfies a predetermined condition from the generated second pattern.

15 Claims, 16 Drawing Sheets

(51) Int. Cl.
*G06F 17/30* (2006.01)
*H04N 21/8541* (2011.01)

(56) References Cited

U.S. PATENT DOCUMENTS

| | | | |
|---|---|---|---|
| 8,176,050 | B2 | 5/2012 | Inakoshi et al. |
| 8,190,632 | B2 | 5/2012 | Tago et al. |
| 8,655,921 | B2 | 2/2014 | Tago et al. |
| 8,732,117 | B2 | 5/2014 | Maruhashi et al. |
| 2005/0257006 | A1 | 11/2005 | Yoshida et al. |
| 2008/0162443 | A1* | 7/2008 | Asai ............ G06F 17/30938 |
| 2009/0009807 | A1 | 1/2009 | Sugi |
| 2009/0216751 | A1 | 8/2009 | Tago |
| 2011/0182479 | A1 | 7/2011 | Sese et al. |
| 2013/0066827 | A1 | 3/2013 | Maruhashi et al. |
| 2013/0325761 | A1 | 12/2013 | Morikawa et al. |
| 2014/0114900 | A1* | 4/2014 | Katoh ............ G06N 5/04 706/48 |
| 2014/0136149 | A1* | 5/2014 | Katoh et al. ............ 702/189 |
| 2014/0156692 | A1* | 6/2014 | Katoh et al. ............ 707/758 |

FOREIGN PATENT DOCUMENTS

| | | |
|---|---|---|
| JP | 2001-522095 | 11/2001 |
| JP | 200917340 A | 1/2009 |
| WO | 99-23577 | 5/1999 |
| WO | 2004010232 | 1/2004 |
| WO | 2010041678 | 4/2010 |

OTHER PUBLICATIONS

Detecting hot topics in technology news streams Bo You; Ming Liu; Bing-Quan Liu; Xiao-Long Wang Machine Learning and Cybernetics (ICMLC), 2012 International Conference on Year: 2012, vol. 5 pp. 1968-1974, DOI: 10.1109/ICMLC.2012.6359678 Referenced in: IEEE Conference Publications.*

Aligning Qualitative, Real-Time, and Probabilistic Property Specification Patterns Using a Structured English Grammar Autili, M.; Grunske, L.; Lumpe, M.; Pelliccione, P.; Tang, A. Software Engineering, IEEE Transactions on Year: 2015, vol. 41, Issue: 7 pp. 620-638, DOI: 10.1109/TSE.2015.2398877 Referenced in: IEEE Journals & Magazines.*

Event Detection Time for Mobile Sensor Networks Using First Passage Processes Inaltekin, H.; Tavoularis, C.R.; Wicker, S.B. Global Telecommunications Conference, 2007. GLOBECOM '07. IEEE Year: 2007 pp. 1174-1179, DOI: 10.1109/GLOCOM.2007.226 Referenced in: IEEE Conference Publications.*

Ordonez, C. et al., "Horizontal Aggregations in SQL to Prepare Data Sets for Data Mining Analysis", IEEE Transactions on Knowledge and Data Engineering, vol. 24, No. 4. pp. 678-691, Apr. 2012, IEEE Computer Society.

Weng, N. et al., "Scalable Parallel Join for Huge Tables", Big Data (BigData Congress), 2013 IEEE International Congress on Big Data, pp. 157-164, IEEE Computer Society.

Zhu, H. et al., "Efficient Star Join for Column-oriented Data Store in the MapReduce Enviroment", 2011 Eighth Web Information Systems and Applications Conference (WISA), pp. 13-18, IEEE Computer Society.

Su, W. et al. "Combining Tag and Value Similarity for Data Extraction and Alignment", IEEE Transaction on Knowledge and Data Engineering, Jul. 2012, vol. 24, No. 7, pp. 1186-1200, IEEE Computer Society.

US Notice of Allowance issued on Sep. 25, 2015 in co-pending U.S. Appl. No. 14/032,381, 19 pages.

\* cited by examiner

| 1 | 2 | 3 | 4 | 5 |
|---|---|---|---|---|
| A | A |   |   |   |
|   | B |   | B | B |
|   |   | C |   | C |

13a

13b

COMPUTER-READABLE RECORDING MEDIUM, EXTRACTING DEVICE, AND EXTRACTING METHOD

CROSS-REFERENCE TO RELATED APPLICATION

This application is based upon and claims the benefit of priority of the prior Japanese Patent Application No. 2012-232295, filed on Oct. 19, 2012, the entire contents of which are incorporated herein by reference.

FIELD

The embodiments discussed herein are directed to an extracting program, an extracting device and an extracting method.

BACKGROUND

There is an extracting device which extracts patterns including a predetermined pattern in which an event and an order at which the event appears, from patterns of events indicated by event data obtained by associating events which actually occur and times at which the events appear. In addition, a pattern obtained by associating an event and an order at which the event occurs is also referred to as an "episode". In the following description, this pattern is referred to as an "episode" in some cases. An example of an episode is the following episode. For example, there is an episode that, after an event A that "a person A takes a medicine A" and an event B that "the person A takes a medicine B", an event C that "the person A has a fever". When the extracting device performs the above extraction using this episode, it is possible to extract episodes including an episode that, after the events A and B appear, the above event C appears. For example, the extracting device can extract an episode that an event D that "the person A takes a medicine C" occurs upon appearance the events A and B and, after the events A, B and D appear, the event C appears. When this episode is extracted by the extracting device, a user of the extracting device can learn that the person A took the medicine C together with the medicine A and the medicine B before the person A has a fever.

Further, an example of the above extracting device is the following extracting device. For example, there is an extracting device which extracts episodes including a predetermined episode by generating a child from a parent in an enumeration tree, and determining whether or not the generated child occurs in a pattern of an event indicated by event data and includes the predetermined pattern. This extracting device first sets an empty episode to which no event is set, to a parent episode which is a root of the enumeration tree, and then performs the following processing to generate an enumeration tree. That is, the extracting device generates a child episode by setting as a child episode an episode obtained by adding an event included in event data to a parent episode. Further, the extracting device generates a child episode again by using a newly generated child episode as a parent episode. Thus, the extracting device repeatedly generates a child episode until a predetermined condition is satisfied.

Patent Literature 1: Japanese Laid-open Patent Publication No. 2001-522095

Patent Literature 2: Japanese Laid-open Patent Publication No. 04-125734

Patent Literature 3: Japanese Laid-open Patent Publication No. 08-6957

However, there is a problem that the extracting device is not able to efficiently extract episodes including a predetermined episode. This extracting device generates a child episode which does not include a predetermined episode in some cases. Hence, the extracting device generates a child episode which is not extracted in some cases. Therefore, the extracting device generates a wasteful child episode. Therefore, the extracting device is not able to efficiently extract episodes.

SUMMARY

According to an aspect of an embodiment, a computer-readable recording medium stores therein an extracting program causing a computer to execute a process. The process includes based on event data obtained by associating a plurality of events stored in a storage unit and an occurrence time of each event, sequentially adding an event to a first pattern obtained by associating the plurality of events and the occurrence order of each event, and sequentially generating a second pattern which includes the first pattern and occurs in the event data; and extracting a pattern which satisfies a predetermined condition from the generated second pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. In addition, this embodiment by no means limits the disclosed technique.

Embodiment

[a] Embodiment

Configuration of Extracting Device

Figure 1:
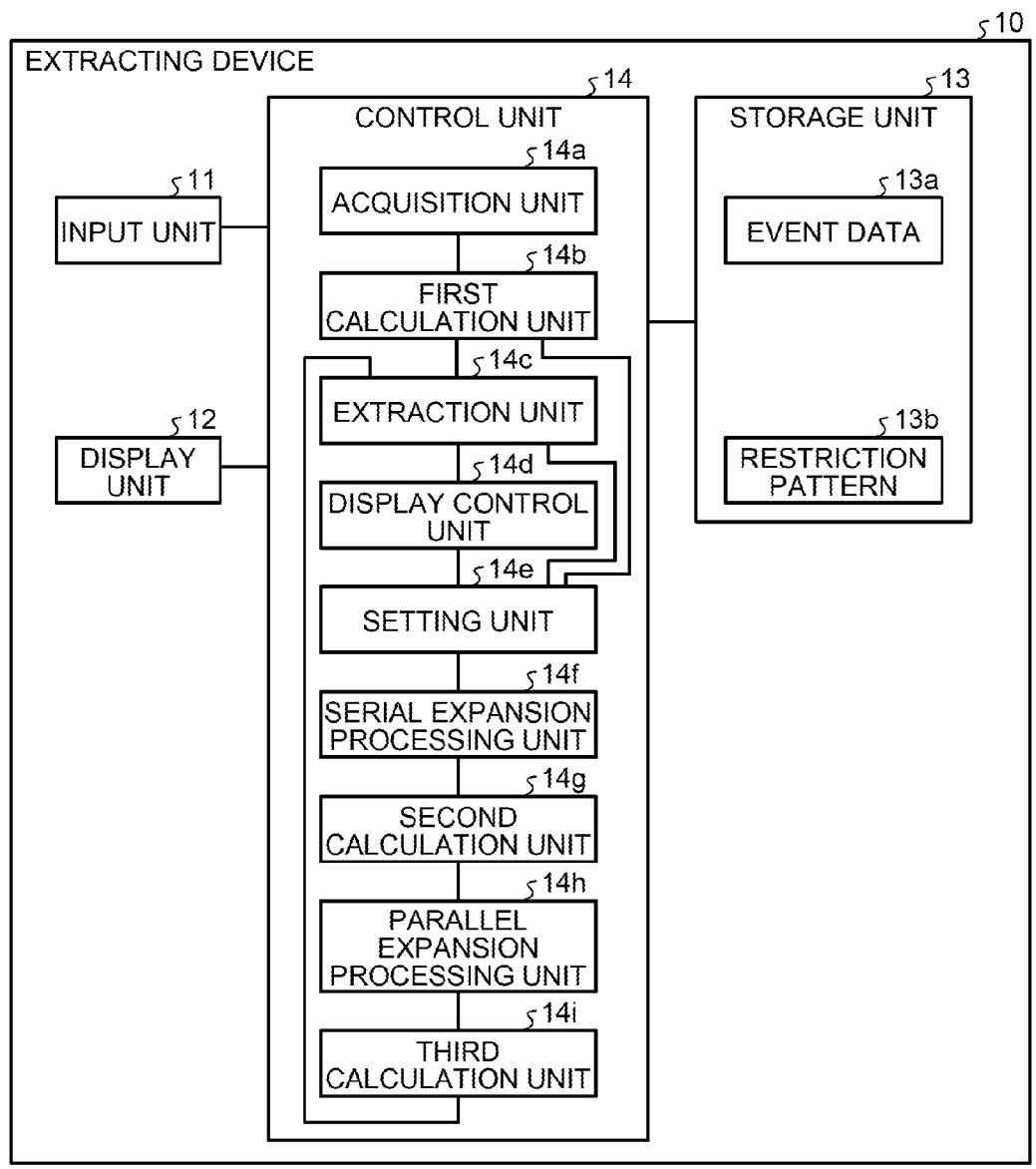
FIG. 1 is a view illustrating an example of a functional configuration of an extracting device according to an embodiment.

An extracting device according to a embodiment will be described. FIG. 1 is a view illustrating an example of a functional configuration of the extracting device according to the embodiment. As illustrated in FIG. 1, an extracting device 10 has an input unit 11, a display unit 12, a storage unit 13 and a control unit 14.

The input unit 11 inputs information to the control unit 14. For example, the input unit 11 receives a user's command, and inputs a command for executing extraction processing described below, to the control unit 14. Further, the input unit 11 receives a user's command, and inputs a command for acquiring event data 13a described below from a predetermined server, to the control unit 14. Furthermore, the input unit 11 receives a user's operation, and inputs a restriction pattern 13b described below, to the control unit 14. An example of a device of the input unit 11 is a keyboard or a mouse.

The display unit 12 displays various pieces of information. For example, the display unit 12 displays an episode including the restriction pattern 13b described below and extracted by an extraction unit 14c described below under control of a display control unit 14d.

The storage unit 13 stores various programs executed by the control unit 14. Further, an acquisition unit 14a stores the event data 13a and the restriction pattern 13b in the storage unit 13.

Figures 2, 3:
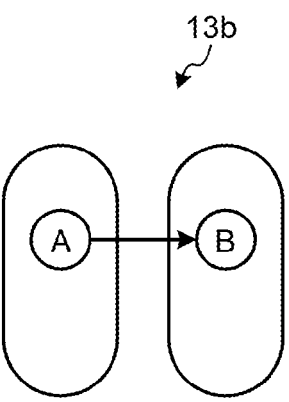
FIG. 2 is a view illustrating an example of a data configuration of event data.
FIG. 3 is a view illustrating an example of a restriction pattern.

The event data 13a will be described. The event data 13a is data obtained by associating an event which actually occurs and a time at which the event appears. FIG. 2 is a view illustrating an example of a data configuration of event data. The event data 13a illustrated in an example in FIG. 2 indicates that an event indicated by an identifier A occurs at a time "1". Further, the event data 13a illustrated in the example in FIG. 2 indicates that the event indicated by the identifier A and an event indicated by an identifier B occur at a time "2". Furthermore, the event data 13a illustrated in the example in FIG. 2 indicates that an event indicated by an identifier C occurs at a time "3". Still further, the event data 13a illustrated in the example in FIG. 2 indicates that the event indicated by the identifier B occurs at a time "4". Moreover, the event data 13a illustrated in the example in FIG. 2 indicates that the event indicated by the identifier B and the event indicated by the identifier C occur at a time "5". Hereinafter, the event indicated by the identifier A is represented as an "event A". Further, similarly, the event indicated by the identifier B is represented as an "event B", and the event indicated by the identifier C is represented as an "event C".

The restriction pattern 13b will be described. The restriction pattern 13b is an episode included in an episode to be extracted. An episode represents an order at which an event occurs (occurrence order) as a digraph. For example, the restriction pattern 13b includes a plurality of parts. A plurality of parts includes events. An order is set to each part. A relationship between an event included in an N-th part and an event included in a (N+1)th part of the restriction pattern 13b will be described. A relationship between the event included in the N-th part and the event included in the (N+1)th part is a relationship that, after all events included in the N-th part appear, the event included in the (N+1)th part appears. FIG. 3 is a view illustrating an example of a restriction pattern. The restriction pattern 13b illustrated in FIG. 3 indicates that the event A is included in the first part and the event B is included in the second part. The restriction pattern 13b illustrated in FIG. 3 indicates that, after the event A of events is included in the first part appears, the event B of events is included in the second part.

Here, times in which the restriction pattern 13b illustrated in FIG. 3 occurs as an event pattern indicated by the event data 13a illustrated in FIG. 2 are represented by (1, 2), (1, 4), (1, 5), (2, 4) and (2, 5). Meanwhile, a minimum (least) time in which the restriction pattern 13b occurs as an event pattern indicated by the event data 13a is (1, 2). In the following description, such a minimum time in which an episode or a single event occurs in the event data 13a is represented as a "minimum occurrence". (T1, T2) indicates a time from a start at a time T1 to an end at a time T2.

The storage unit 13 is a semiconductor memory element such as a flash memory or a storage device such as a hard disk or an optical disk. In addition, the storage unit 13 is not limited to the above types of the storage devices, and may be a RAM (Random Access Memory) or a ROM (Read Only Memory).

The control unit 14 has an internal memory which stores programs and control data which define various types of processing process, and executes various processing using these programs and data. The control unit 14 has the acquisition unit 14a, a first calculation unit 14b, the extraction unit 14c, the display control unit 14d, a setting unit 14e, a serial expansion processing unit 14f, a second calculation unit 14g, a parallel expansion processing unit 14h and a third calculation unit 14i.

The acquisition unit 14a acquires various pieces of information. When, for example, receiving from the input unit 11 an input of a command of acquiring event data from a predetermined server, the acquisition unit 14a accesses the predetermined server which is not illustrated through a network which is not illustrated based on this command, and acquires the event data 13a from the predetermined server. Further, the acquisition unit 14a stores the acquired event data 13a in the storage unit 13. Furthermore, when receiving an input of the restriction pattern 13b from the input unit 11, the acquisition unit 14a acquires the inputted restriction pattern 13b and stores the acquired restriction pattern 13b in the storage unit 13.

Still further, when receiving from the input unit 11 an input of a command of executing extraction processing, the acquisition unit 14a acquires the event data 13a and the restriction pattern 13b from the storage unit 13.

The first calculation unit 14b calculates various pieces of information. When, for example, the acquisition unit 14a acquires the event data 13a and the restriction pattern 13b from the storage unit 13, the first calculation unit 14b performs the next processing. That is, the first calculation unit 14b calculates minimum occurrences of all events which occur in the event data indicated by the event data 13a. When, for example, the acquisition unit 14a acquires the event data 13a illustrated in FIG. 2 and the restriction pattern 13b illustrated in FIG. 3, the first calculation unit 14b calculates minimum occurrences (1, 1) and (2, 2) of the event A which occur in the event data indicated by the event data 13a. Similarly, the first calculation unit 14b calculates minimum occurrences (2, 2), (4, 4) and (5, 5) of the event B, and calculates minimum occurrences (3, 3) and (5, 5) of the event C.

Further, the first calculation unit 14b calculates the minimum occurrence of each part of the restriction pattern 13b. A specific example will be described. The first calculation unit 14b calculates the minimum occurrences (1, 1) and (2, 2) of the event included in the first part of the restriction pattern 13b, that is, the event A. Further, the first calculation unit 14b calculates the minimum occurrences (2, 2), (4, 4) and (5, 5) of the event included in the second part, that is, the event B.

Furthermore, the first calculation unit 14b calculates the minimum occurrences of continuous parts including the last part of the restriction pattern 13b. For example, the last part is the second part in the restriction pattern 13b illustrated in FIG. 3, and the first calculation unit 14b calculates the minimum occurrences (2, 2), (4, 4) and (5, 5) of the second part. In addition to this, the first calculation unit 14b calculates minimum occurrences (1, 2) and (2, 4) of continuous parts from the first part and to second part. In addition, in the following description, the continuous parts including the last part of the restriction pattern 13b are represented as "continuous restriction parts" in some cases.

Further, the first calculation unit 14b stores all calculation results in the internal memory. This is because the second calculation unit 14g described below repeatedly uses the above calculation results.

The extraction unit 14c extracts an episode which includes the restriction pattern 13b and a frequency of which satisfies the predetermined condition. For example, the extraction unit 14c calculates a value of "1" as the frequency when there is a minimum occurrence of a parent episode and calculates a value of "0" when there is not the minimum occurrence per parent episode newly set by the setting unit 14e described below. This frequency is also referred to as a "binary frequency". Similarly, the extraction unit 14c calculates a value of "1" as the frequency when there is a minimum occurrence of a parent episode and calculates a value of "0" when there is not the minimum occurrence per parent episode newly set by the setting unit 14e described below. Further, the extraction unit 14c determines whether or not the calculated frequency is "1". Furthermore, when the calculated frequency is "1", the extraction unit 14c determines that the parent episode frequently occurs, and extracts this parent episode from the event data 13a. Meanwhile, when the calculated frequency is not "1", that is, "0", the extraction unit 14c determines that the parent episode does not frequently occur, and does not extract this parent episode from the event data 13a. Although a case will be described below where the disclosed device calculates a "binary frequency" as a frequency, the disclosed device is not limited to this. When, for example, a child frequency is determined based on a minimum occurrence and is the parent frequency or less, the disclosed device can calculate a frequency other than the binary frequency, and determine whether or not the parent episode frequently occurs, based on the calculated frequency. An example of this frequency is a "window frequency". The "window frequency" is the number of sections including a minimum occurrence in a set of predetermined sections or the number of sections including a minimum occurrence in a set of a plurality of sections part of which overlap in previous or subsequent sections. When the "window frequency" is calculated as a frequency, the extraction unit 14c can determine whether or not the parent episode frequently occurs by determining whether or not the "window frequency" of the parent episode is a threshold or more. Further, another example is a "non-overlapping minimum occurrence frequency". The "non-overlapping minimum occurrence frequency" indicates a maximum number of minimum occurrences the times of which do not overlap (which are not the same). When calculating the "non-overlapping minimum occurrence frequency" as the frequency, the extraction unit 14c can determine whether or not the parent episode frequency occurs by determining whether or not the "non-overlapping minimum occurrence frequency" of the parent episode is a predetermined threshold or more. In addition, in the present embodiment, the parent episode set by the setting unit 14e described below includes the restriction pattern 13b and, consequently, the extraction unit 14c can efficiently extract an episode including the restriction pattern 13b. Further, in the following description, an episode of a parent is abbreviated as a "parent episode". An episode of a child is abbreviated as a "child episode" likewise.

Further, the extraction unit 14c determines whether or not all newly set parent episodes do not frequency occur every time a parent episode is newly set by the setting unit 14e described below. Similarly, the extraction unit 14c determines whether or not all new parent episodes do not frequency occur every time a parent episode is newly set by the setting unit 14e described below.

The display control unit 14d controls display of the display unit 12 to provide various displays. When, for example, the setting unit 14e described below sets a parent episode which frequently occurs as a parent episode P, the display control unit 14d controls display of the display unit 12 to display the new parent episode P. In addition, when the setting unit 14e described below sets a parent episode which frequently occurs as a parent episode P, the display control unit 14d controls display of the display unit 12 to display a minimum occurrence together with the new parent episode P.

Figure 4:
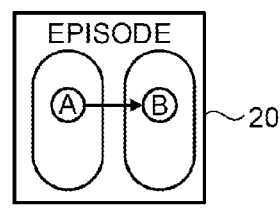
FIG. 4 is a view for explaining an example of processing executed by the extracting device according to the embodiment.

The setting unit 14e makes various settings. When, for example, the first calculation unit 14b calculates minimum occurrences of restriction continuous parts, the setting unit 14e sets the restriction pattern 13b to the first parent, that is, the root in the enumeration tree. FIG. 4 is a view for explaining an example of processing executed by the extracting device according to the embodiment. As illustrated in an example in FIG. 4, the setting unit 14e sets the restriction pattern 13b to a parent episode 20.

Figure 5:
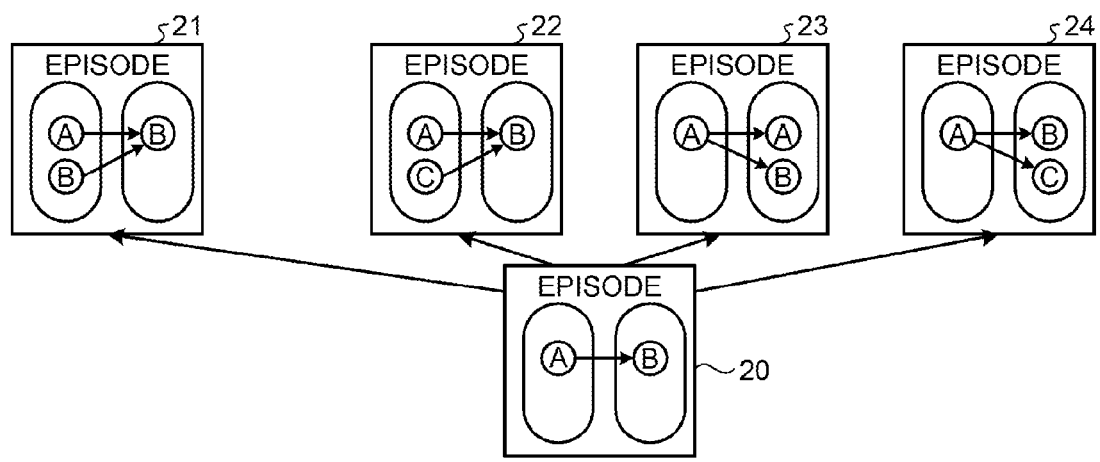
FIG. 5 is a view for explaining an example of processing executed by the extracting device according to the embodiment.

Further, the setting unit 14e determines whether or not child episodes are newly generated by serial expansion processing described below and executed by the serial expansion processing unit 14f described below and parallel expansion processing described below and executed by the parallel expansion processing unit 14h described below. When child episodes are newly generated, the setting unit 14e sets the newly generated child episodes as parent episodes. FIG. 5 is a view for explaining an example of processing executed by the extracting device according to the embodiment. As illustrated in an example in FIG. 5, when child episodes 21, 22, 23 and 24 are newly generated by serial expansion processing described below and executed by the serial expansion processing unit 14f described below and parallel expansion processing described below and executed by the parallel expansion processing unit 14h described below, the setting unit 14e performs the following processing. That is, the setting unit 14e sets the newly generated child episodes 21, 22, 23 and 24 as parent episodes.

Further, when the extraction unit 14c determines that at least one of the newly set parent episodes frequently occurs, the setting unit 14e sets the parent episode which frequently occurs as the new parent episode P. Similarly, when the extraction unit 14c determines that at least one of the newly set parent episodes frequently occurs, the setting unit 14e sets the parent episode which frequently occurs as the new parent episode P. When, for example, parent episodes 21, 22, 23 and 24 illustrated in the example in FIG. 5 frequently occur, the setting unit 14e sets the parent episodes 21, 22, 23 and 24 as the new parent episodes P.

Figure 6:
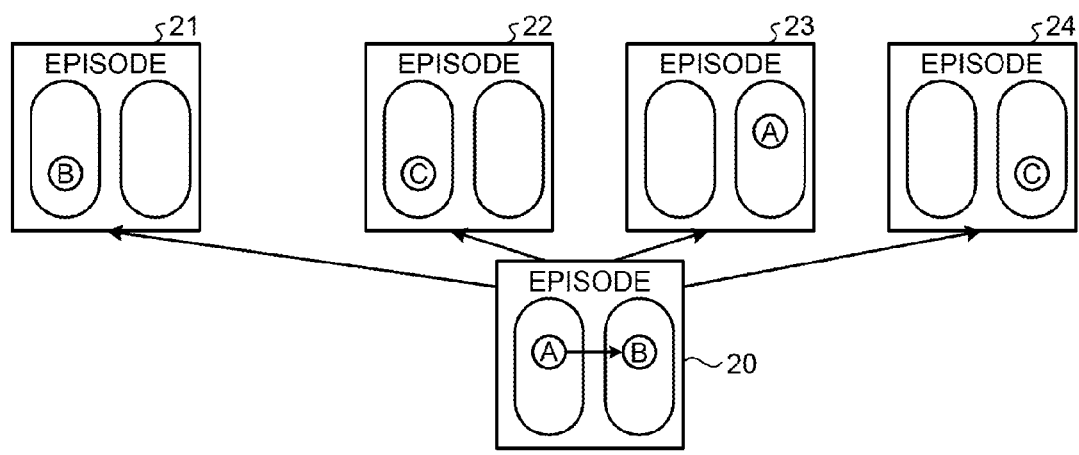
FIG. 6 is a view for explaining an example of processing executed by the extracting device according to the embodiment.

Further, when the display control unit 14d controls display of the display unit 12 to display the new parent episodes P, the setting unit 14e generates an episode P' obtained by removing the parent episode P from the restriction pattern 13b for each of the new parent episodes P. FIG. 6 is a view for explaining an example of processing executed by the extracting device according to the embodiment. As illustrated in an example in FIG. 6, for example, the setting unit 14e generates episodes 21, 22, 23 and 24 obtained by removing the restriction pattern 13b from the parent episodes 21, 22, 23 and 24 illustrated in the example in FIG. 5.

Then, the setting unit 14e sets for each of the episodes P' the order of a part of the last order including an event among episodes P' to a variable i per episode P'. For example, the setting unit 14e sets an order "1" of a part of the last order including an event in the episode 21 illustrated in the example in FIG. 6, to the variable i associated with the episode 21. Further, the setting unit 14e sets an order "2" of a part of the last order including an event in the episode 23 illustrated in the example in FIG. 6, to the variable i associated with the episode 23. In addition, when there is not a part including an event in the episode P', the setting unit 14e sets "0" to the variable i associated with the episode P'.

Subsequently, the setting unit 14e sets for each of the episodes P' an identifier of an event the identifier of which is the earliest in the alphabetical order in an I-th (which is a value indicated by the variable i associated with the episode) part of the episode P', to a variable e per episode P'. For example, the setting unit 14e sets an identifier "B" of the event B the identifier of which is the earliest in the alphabetical order in the first (which is a value indicated by the variable i associated with the episode 21) part of the episode 21 illustrated in the example in FIG. 6, to the variable e associated with the episode 21. In addition, when the I-th part of the episode P' is the zeroth part or an event is not included in the I-th part, the setting unit 14e sets "0" to the variable e.

The serial expansion processing unit 14f executes serial expansion processing. The serial expansion processing unit 14f which executes serial expansion processing will be described. For example, the serial expansion processing unit 14f determines whether or not there are the unselected parent episodes P among the new parent episodes P. When there is the unselected parent episode P, one unselected parent episode P is selected. In case of the example illustrated in FIG. 4, when, for example, the parent episode 20 is unselected, the serial expansion processing unit 14f selects the unselected parent episode 20. Further, in case of the example in FIG. 5, when the parent episode 21 is unselected, the serial expansion processing unit 14f selects one unselected parent episode 21.

Furthermore, the serial expansion processing unit 14f determines whether or not an event which is not included in a part of the same order of the restriction pattern 13b can be added to a part subsequent to the I-th part in the selected parent episode. In addition, in the present embodiment, two or more same events are not included in the same part. In case of the example in FIG. 4, the serial expansion processing unit 14f determines that the event B or the event C which is not included in a (first) part of the same order of the restriction pattern 13b can be added to the first part which is a part subsequent to the zeroth part of the selected parent episode 20. Further, in case of the example in FIG. 4, the serial expansion processing unit 14f determines that the event A or the event C which is not included in a (second) part of the same order of the restriction pattern 13b can be added to the second part which is a part subsequent to the zeroth part of the selected parent episode 20. Furthermore, in case of the example in FIG. 5, the serial expansion processing unit 14f determines that the event A or the event C which is not included in a (second) part of the same order of the restriction pattern 13b can be added to the second part which is a part subsequent to the first part of the selected parent episode 21.

When determining that the event can be added, the serial expansion processing unit 14f generates all child episodes by adding events which are not included in a part of the same order of the restriction pattern 13b to parts subsequent to the I-th part of the selected parent episode P. In case of the example in FIG. 4, when determining that the event B or the event C which is not included in the (first) part of the same order of the restriction pattern 13b can be added to the first part which is a part subsequent to the first part of the selected parent episode 20, the serial expansion processing unit 14f performs the following processing. That is, as illustrated in FIG. 5, the serial expansion processing unit 14f generates the child episode 21 by adding the event B which is not included in a part of the same order of the restriction pattern 13b to the first part of the selected parent episode 20. Further, as illustrated in FIG. 5, the serial expansion processing unit 14f generates the child episode 22 by adding the event C which is not included in a part of the same order of the restriction pattern 13b to the first part of the selected parent episode 20.

When determining that the event is not able to be added or generating a new child episode, the serial expansion processing unit 14f performs again processing of determining whether or not there are the unselected parent episodes P among the new parent episodes P, and performs the above processing subsequent to this processing.

Further, in case of the example in FIG. 4, when determining that the event A or the event B which is not included in the (second) part of the same order of the restriction pattern 13b can be added to the second part of the selected parent episode 20, the serial expansion processing unit 14f performs the following processing. That is, as illustrated in FIG. 5, the serial expansion processing unit 14f generates the child episode 23 by adding the event A which is not included in a part of the same order of the restriction pattern 13b to the second part of the selected parent episode 20. Further, as illustrated in FIG. 5, the serial expansion processing unit 14f generates the child episode 24 by adding the event C which is not included in a part of the same order of the restriction pattern 13b to the second part of the selected parent episode 20.

The second calculation unit 14g executes first minimum occurrence calculation processing of calculating partial minimum occurrences and minimum occurrences of child episodes generated by the serial expansion processing unit 14f.

Hereinafter, a partial minimum occurrence will be described. A partial minimum occurrence is a minimum occurrence of events from an event included in a top part of an episode to an event included in a part of an episode to which an event is added upon generation of the episode.

More specifically, the second calculation unit 14g first determines whether or not there is an unselected child episode among the child episodes generated by the serial expansion processing unit 14f. When there are the unselected child episodes P, one unselected child episode is selected. Further, the second calculation unit 14g determines whether or not a partial minimum occurrence of the parent episode P of the selected child episode has already been calculated. When, for example, the child episode 21 is selected in the example in FIG. 5, the partial minimum occurrence of the parent episode 20 is not yet calculated, and then the second calculation unit 14g determines that the partial minimum occurrence of the parent episode 20 of the selected child episode 21 is not yet calculated.

When the partial minimum occurrence of the parent episode P is not yet calculated, the second calculation unit 14g performs the following processing. That is, the second calculation unit 14g calculates a partial minimum occurrence of a child episode based on a minimum occurrence of an event added upon generation of the selected child episode and a minimum occurrence of a part of the restriction pattern 13b corresponding to a part to which this event is added. In the example in FIG. 5, the second calculation unit 14g acquires from the internal memory the minimum occurrences (2, 2), (4, 4) and (5, 5) of the event B added upon generation of the child episode 21. Further, the second calculation unit 14g acquires from the internal memory the minimum occurrences (1, 1) and (2, 2) of the first part of the restriction pattern 13b corresponding to the first part to which the event B is added. Furthermore, the second calculation unit 14g calculates the partial minimum occurrence (2, 2) of the child episode 21 from the minimum occurrences (2, 2), (4, 4) and (5, 5) of the event B and the minimum occurrences (1, 1) and (2, 2) of the first part of the restriction pattern 13b. Still further, in the example illustrated in FIG. 5, the second calculation unit 14g calculates partial minimum occurrences according to the same method even when the child episodes 22 to 24 are selected. That is, the second calculation unit 14g calculates the partial minimum occurrence (2, 3) of the child episode 22, the partial minimum occurrence (1, 2) of the child episode 23 and partial minimum occurrences (1, 3) and (2, 4) of the child episode 24.

Further, the second calculation unit 14g determines whether or not there is a part subsequent to a part to which an event is added upon generation of a selected child episode. When, for example, the child episode 21 is selected in the example in FIG. 5, the second calculation unit 14g determines whether or not there is a part subsequent to the first part to which the event B is added upon generation of the child episode 21. In this case, there is the second part, and then the second calculation unit 14g determines that there is a part subsequent to the first part to which the event B is added upon generation of the child episode 21. Further, in the example illustrated in FIG. 5, the second calculation unit 14g performs determination according to the same method even when the child episodes 22 to 24 are selected. In this case, the second calculation unit 14g determines that there is a part subsequent to the first part to which the event C is added upon generation of the child episode 22. Further, the second calculation unit 14g determines that there is not a part subsequent to the second part to which the event B is added upon generation of the child episode 23. Furthermore, the second calculation unit 14g determines that there is no part subsequent to the second part to which the event C is added upon generation of the child episode 24.

When there is a part subsequent to a part to which an event is added upon generation of a selected child episode, the second calculation unit 14g performs the following processing. That is, the second calculation unit 14g calculates a minimum occurrence of the selected child episode based on minimum occurrences and partial minimum occurrences of continuous restriction parts corresponding to a part next to a part to which an event is added to a last part. When, for example, the child episode 21 is selected in the example in FIG. 5, the second calculation unit 14g performs the following processing. That is, the second calculation unit 14g acquires minimum occurrences (2, 2), (4, 4) and (5, 5) of continuous parts corresponding to the second part next to the first part to which the event B is added upon generation of the child episode 21. Further, the second calculation unit 14g calculates the minimum occurrence (2, 4) of the child episode 21 based on the partial minimum occurrence of the child episode 21 and the minimum occurrences (2, 2), (4, 4) and (5, 5) of the continuous restriction parts corresponding to the second part. When, for example, the child episode 22 is selected in the example in FIG. 5, the second calculation unit 14g performs the following processing. That is, the second calculation unit 14g acquires minimum occurrences (2, 2), (4, 4) and (5, 5) of continuous parts corresponding to the second part next to the first part to which the event C is added upon generation of the child episode 22. Further, the second calculation unit 14g calculates the minimum occurrence (2, 4) of the child episode 22 based on the partial minimum occurrence (2, 3) of the child episode 22 and the minimum occurrences (2, 2), (4, 4) and (5, 5) of the continuous restriction parts corresponding to the second part.

Here, when there is no part subsequent to a part to which an event is added upon generation of a selected child episode, the second calculation unit 14g calculates a partial minimum occurrence of the selected child episode as a minimum occurrence of a child episode. When, for example, the child episode 23 is selected in the example in FIG. 5, the second calculation unit 14g calculates the partial minimum occurrence (1, 2) of the child episode 23 as the minimum occurrence (1, 2) of the child episode 23. Further, when the child episode 24 is selected in the example in FIG. 5, the second calculation unit 14g calculates the partial minimum occurrences (1, 3) and (2, 4) of the child episode 24 as the minimum occurrences (1, 3) and (2, 4) of the child episode 24.

In addition, there are child episodes minimum occurrences of which are not be able to be calculated by the second calculation unit 14g. Being not able to calculate a minimum occurrence means that this child episode does not occur in an event pattern indicated by the event data 13a. Hence, in the present example, so-called "pruning" of stopping generating a new child episode using as a parent a child episode a minimum occurrence of which is not calculated.

Figure 7:
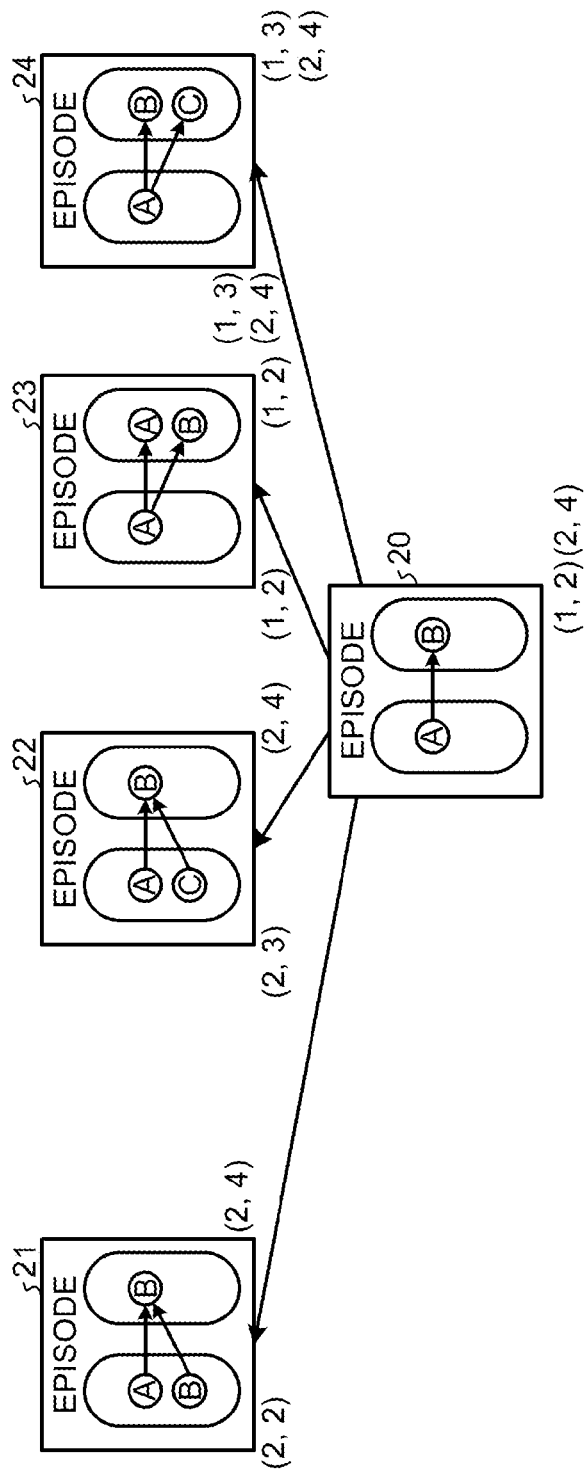
FIG. 7 is a view illustrating an example of a calculation result in case that a serial expansion processing unit executes expansion processing with respect to a parent episode illustrated in the example in FIG. 4 once, and a second calculation unit executes first minimum occurrence calculation processing once.

FIG. 7 is a view illustrating an example of a calculation result in case that a serial expansion processing unit executes expansion processing with respect to a parent episode illustrated in the example in FIG. 4 once, and a second calculation unit executes first minimum occurrence calculation processing once. In an example in FIG. 7, a partial minimum occurrence is indicated at a left end of each episode, and a minimum occurrence is indicated at a right end of each episode. In addition, in the example in FIG. 7, a partial minimum occurrence of the parent episode 20 which is a root of the enumeration tree is not calculated and therefore is not illustrated. Further, in the example in FIG. 7, the minimum occurrence of the parent episode 20 is the same as the minimum occurrences (1, 2) and (2, 4) of the top part of the restriction pattern 13*b* calculated by the first calculation unit 14*b* to the last part, and therefore is illustrated at the right end of the parent episode 20.

Furthermore, when a minimum occurrence is calculated (also when calculation of a minimum occurrence does not succeed), the second calculation unit 14*g* performs the following processing. That is, the second calculation unit 14*g* performs again processing of determining whether or not there is an unselected child episode among child episodes generated by the serial expansion processing unit 14*f*, and performs the above processing again. By this means, the second calculation unit 14*g* can try to calculate minimum occurrences of all child episodes generated by the serial expansion processing unit 14*f*.

Here, processing executed by the second calculation unit 14*g* when the second calculation unit 14*g* determines whether or not a partial minimum occurrence of the parent episode P of the selected child episode has been calculated and, as a result, determines that the partial minimum occurrence has been calculated will be described. That is, the second calculation unit 14*g* performs the following processing based on a partial minimum occurrence of the parent episode P, a minimum occurrence of an event added upon generation of the selected child episode and a minimum occurrence of a part of the restriction pattern 13*b* corresponding to a part to which this event is added. That is, the second calculation unit 14*g* calculates a partial minimum occurrence of a child episode. A method of calculating such a partial minimum occurrence of a child episode will be described using FIG. 8.

Figure 8:
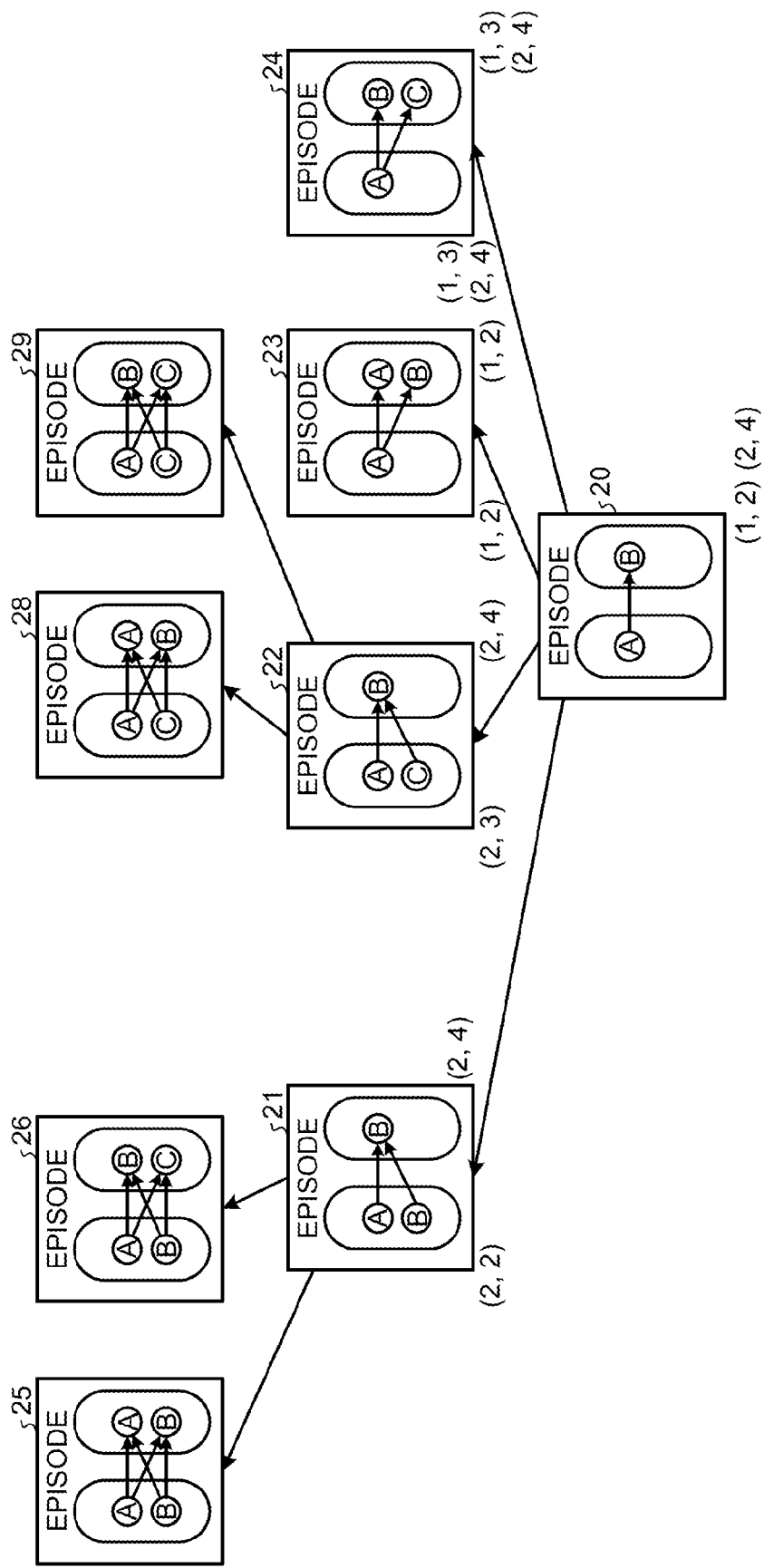
FIG. 8 is a view for explaining an example of a method of calculating a partial minimum occurrence.

FIG. 8 is a view for explaining an example of a method of calculating a partial minimum occurrence. An example in FIG. 8 is a view illustrating an example of a calculation result in case that, after serial expansion processing is executed with respect to the parent episodes illustrated in the example in FIG. 4, first minimum occurrence calculation processing is executed and then serial expansion processing is executed again with respect to new child episodes. When, for example, a child episode 26 is selected in the example in FIG. 8, the second calculation unit 14*g* acquires a partial minimum occurrence (2, 2) of the parent episode 21 of the child episode 26 which has been calculated. Further, the second calculation unit 14*g* acquires from the internal memory the minimum occurrences (3, 3) and (5, 5) of the event C added upon generation of the child episode 26. Furthermore, the second calculation unit 14*g* acquires from the internal memory the minimum occurrences (2, 2), (4, 4) and (5, 5) of the second part of the restriction pattern 13*b* corresponding to the first part to which the event C is added. Still further, the second calculation unit 14*g* calculates the next partial minimum occurrence from the partial minimum occurrence (2, 2) of the parent episode 21, the minimum occurrences (3, 3) and (5, 5) of the event C and the minimum occurrences (2, 2), (4, 4) and (5, 5) of the second part of the restriction pattern 13*b*. That is, the second calculation unit 14*g* calculates the partial minimum occurrence (2, 2) of the child episode 21. Further, in the example illustrated in FIG. 8, the second calculation unit 14*g* calculates a partial minimum occurrence (2, 5) of a child episode 29 according to the same method even when the child episode 29 is selected. In addition, in the example in FIG. 8, events from an event included in a top part of the child episode 25 to an event included in a part to which an event is added upon generation of the child episode 25 do not occur in an event pattern indicated by the event data 13*a*. Hence, the partial minimum occurrence of the child episode 25 is not calculated by the second calculation unit 14*g*. For the same reason, the partial minimum occurrence of a child episode 28 is not calculated by the second calculation unit 14*g*.

Further, when a partial minimum occurrence is calculated (also when calculation of a partial minimum occurrence does not succeed), the second calculation unit 14*g* performs the following processing. That is, the second calculation unit 14*g* performs the above processing of determining whether or not there is a part subsequent to a part to which an event is added upon generation of a selected child episode, and performs the above processing subsequent to this processing.

Figure 9:
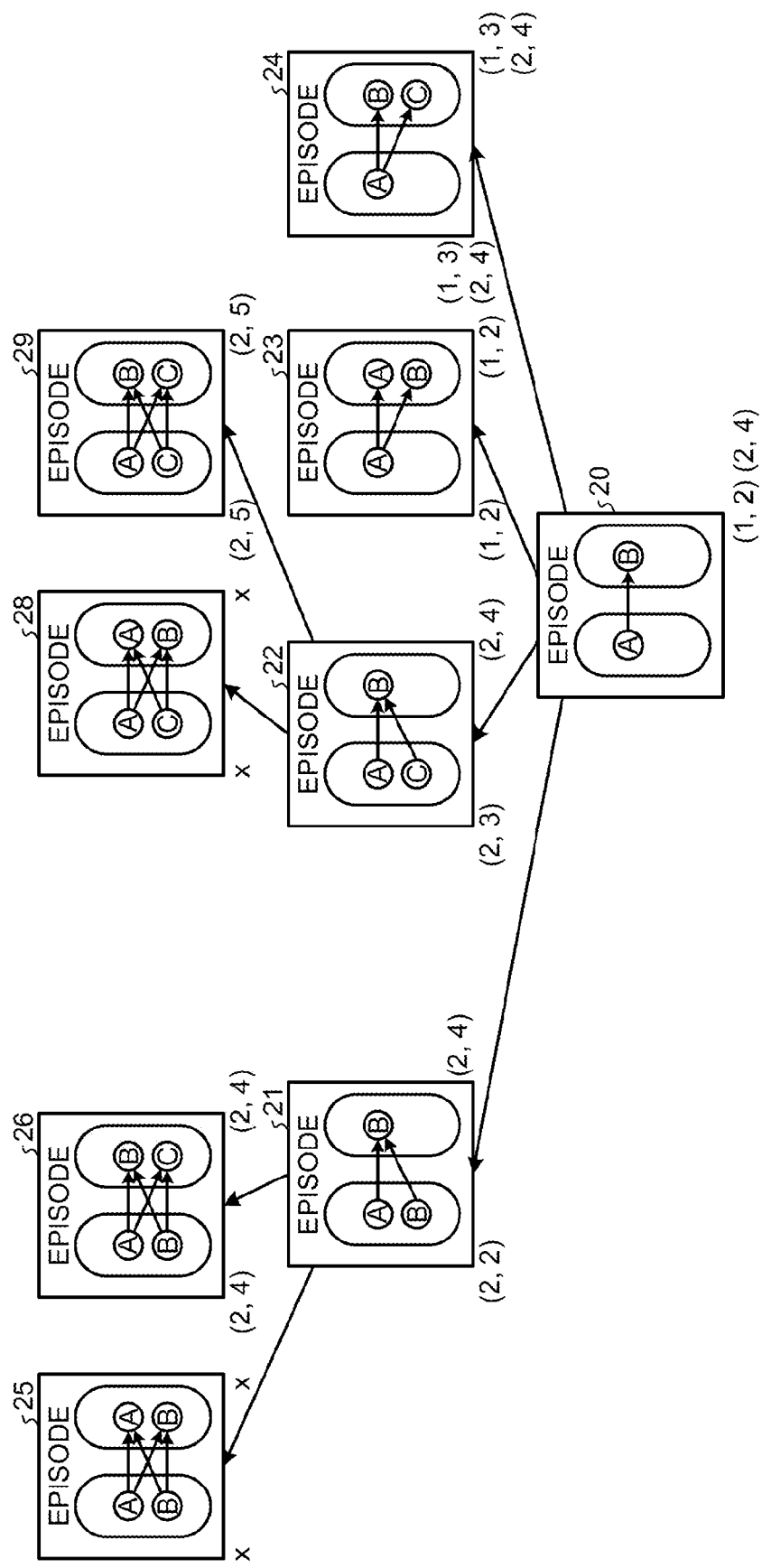
FIG. 9 is a view illustrating an example of a calculation result of first minimum occurrence calculation processing executed with respect to a child episode in case of the example in FIG. 8.

FIG. 9 is a view illustrating an example of a calculation result of first minimum occurrence calculation processing executed with respect to child episodes 25, 26, 28 and 29 in case of the example in FIG. 8. "x" in the example in FIG. 9 indicates that calculation of a partial minimum occurrence or a minimum occurrence is tried, but is not able to be calculated for the above-described reason.

The parallel expansion processing unit 14*h* executes parallel expansion processing. The parallel expansion processing unit 14*h* which executes parallel expansion processing will be described. For example, the serial expansion processing unit 14*f* determines whether or not there are the unselected parent episodes P among the new parent episodes P. When there is the unselected parent episode P, one unselected parent episode P is selected. In case of the example illustrated in FIG. 4, when the parent episode 20 is unselected, the parallel expansion processing unit 14*h* selects one unselected parent episode 20. Further, in case of the example in FIG. 5, when the parent episode 21 is unselected, the parallel expansion processing unit 14*h* selects one unselected parent episode 21.

Furthermore, the parallel expansion processing unit 14*h* determines whether or not the following event can be added to the I-th part of the selected parent episode P. That is, the parallel expansion processing unit 14*h* determines whether or not an event which is indicated by an earlier identifier in the alphabetical order than the identifier indicated by the variable e associated with the selected parent episode P and which is not included in the I-th part of the restriction pattern 13*b* can be added. In case of the example in FIG. 4, when, for example, the parent episode 20 is selected, "0" is set to the corresponding variable i, and therefore it is determined that the event is not able to be added. Further, the event C indicated by the identifier "C" which is earlier in the alphabetical order than the identifier "B" indicated by the corresponding variable e in the parent episode 21 in case of the example in FIG. 9 is not included in the first part of the restriction pattern 13*b*. Hence, when the parent episode 21 is selected, the parallel expansion processing unit 14*h* determines that the event C can be added to the first part of the parent episode 21.

Figure 10:
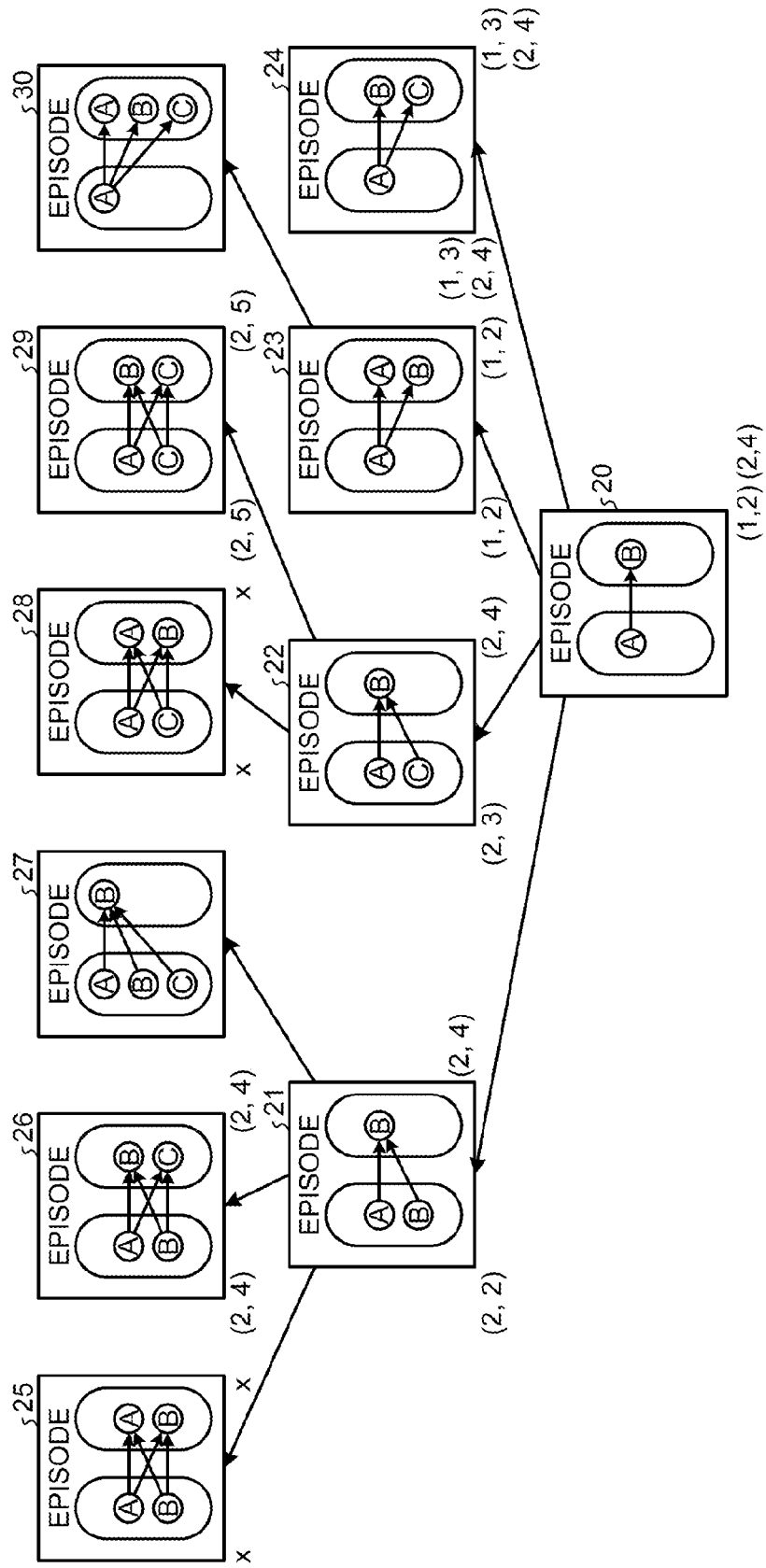
FIG. 10 is a view illustrating an example when parallel expansion processing is executed with respect to a parent episode in case of the example in FIG. 9.

When determining that the event can be added, the parallel expansion processing unit 14*h* generates all child episodes by adding all events which are determined to be able to be added, one by one to the I-th part of the selected parent episode P. In case of the example in FIG. 9, as illustrated in FIG. 10, a child episode 27 is generated by adding the event C to the first part of the selected parent episode 21. In addition, FIG. 10 is a view illustrating an example when parallel expansion processing is executed with respect to the parent episodes 21 to 24 in case of the example in FIG. 9. Further, when the parent episode 23 is selected in case of the example in FIG. 9, as illustrated in FIG. 10, the parallel expansion processing unit 14*h* generates a child episode 30 by adding the event C to the second part of the selected parent episode 23. Furthermore, FIG. 10 illustrates a case as an example where there is no event which can be added to the parent episodes 22 and 24, and therefore the parallel expansion processing unit 14h does not generate child episodes from the parent episodes 22 and 24.

When determining that an event is not able to be added or generating a new child episode, the parallel expansion processing unit 14h performs again processing of determining whether or not there are the unselected parent episodes P among the new parent episodes P, and performs the above processing subsequent to this processing.

The third calculation unit 14i executes second minimum occurrence calculation processing of calculating partial minimum occurrences and minimum occurrences of child episodes generated by the parallel expansion processing unit 14h.

More specifically, the third calculation unit 14i first determines whether or not there is an unselected child episode among the child episodes generated by the parallel expansion processing unit 14h. When there are the unselected child episodes P, one unselected child episode is selected. Further, the third calculation unit 14i performs the following processing based on a partial minimum occurrence of the parent episode P of the selected child episode and a partial minimum occurrence of a sibling episode of the parent which includes in the same part the event added upon generation of the selected episode. That is, the third calculation unit 14i calculates a partial minimum occurrence of the selected child episode.

Figure 11:
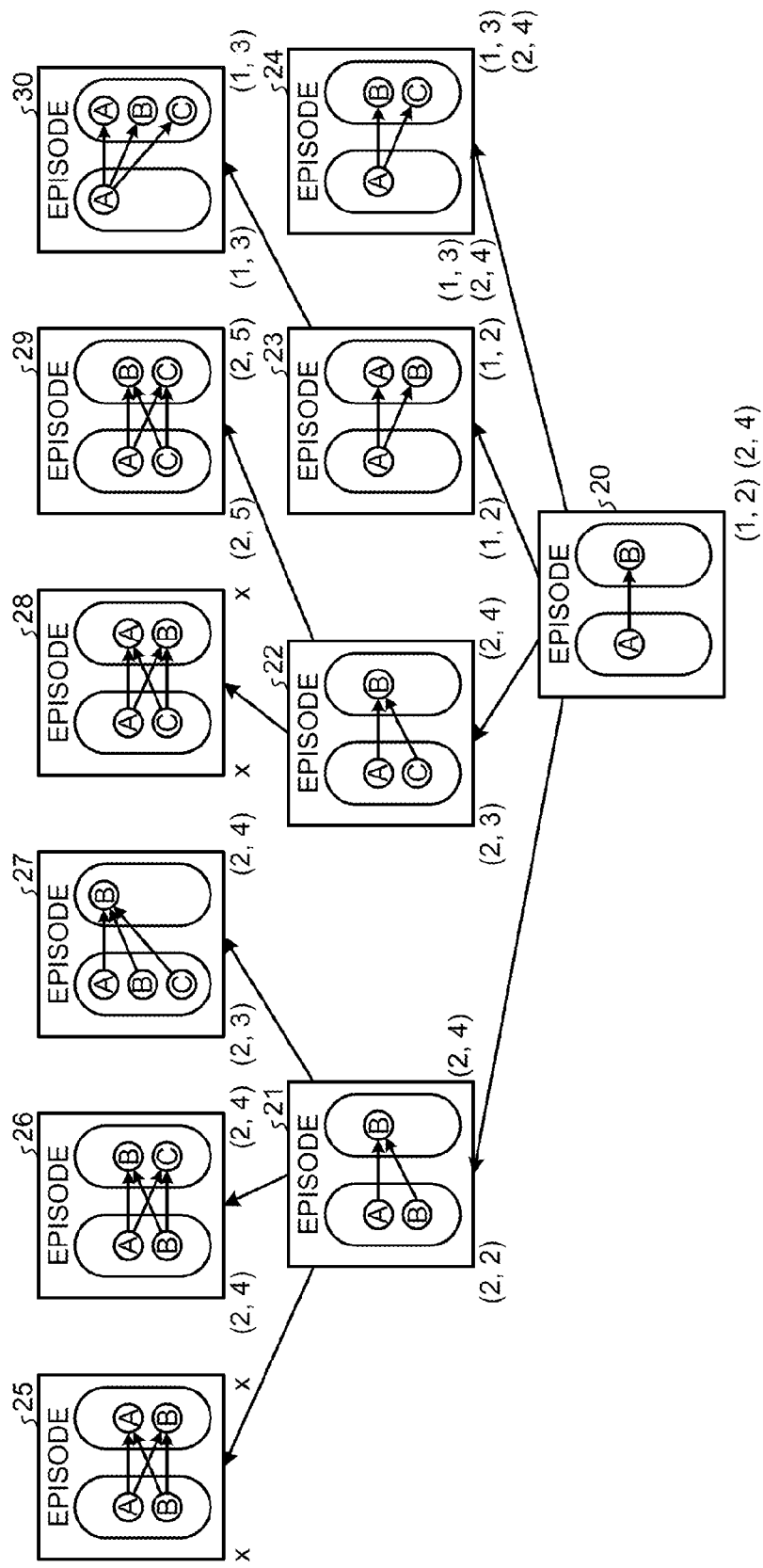
FIG. 11 is a view for explaining an example of processing executed by the extracting device according to the embodiment.

A case will be described in the example in FIG. 10 where the child episode 27 is selected. In this case, the third calculation unit 14i performs the following processing based on a partial minimum occurrence (2, 2) of the parent episode 21 and a partial minimum occurrence (2, 3) of a sibling episode 22 which includes the added event C in the same part. That is, the third calculation unit 14i calculates the partial minimum occurrence (2, 3) of the child episode 27 as illustrated in FIG. 11. Similarly, a case will be described in the example in FIG. 10 where the child episode 30 is selected. In this case, the third calculation unit 14i performs the following processing based on a partial minimum occurrence (1, 2) of the parent episode 23 and partial minimum occurrences (1, 3) and (2, 4) of a sibling episode 24 which includes the added event C in the same part. That is, the third calculation unit 14i calculates the partial minimum occurrence (1, 3) of the child episode 30 as illustrated in FIG. 11.

Further, the third calculation unit 14i performs the following processing based on the minimum occurrence of the parent episode P of a selected child episode and the minimum occurrence of a sibling episode of the parent which includes in the same part an event added upon generation of the selected child episode. That is, the third calculation unit 14i calculates a minimum occurrence of the selected child episode.

A case will be described in the example in FIG. 10 where the child episode 27 is selected. In this case, the third calculation unit 14i performs the following processing based on a minimum occurrence (2, 4) of the parent episode 21 and a minimum occurrence (2, 4) of a sibling episode 22 which includes the added event C in the same part. That is, the third calculation unit 14i calculates the minimum occurrence (2, 4) of the child episode 27 as illustrated in FIG. 11. Similarly, a case will be described in the example in FIG. 10 where the child episode 30 is selected. In this case, the third calculation unit 14i performs the following processing based on a minimum occurrence (1, 2) of the parent episode 23 and minimum occurrences (1, 3) and (2, 4) of a sibling episode 24 of a parent which includes the added event C in the same part. That is, the third calculation unit 14i calculates the partial minimum occurrence (1, 3) of the child episode 30 as illustrated in FIG. 11.

Further, when a minimum occurrence is calculated (also when calculation of a minimum occurrence does not succeed), the third calculation unit 14i performs the following processing. That is, the third calculation unit 14i performs again processing of determining whether or not there is an unselected child episode among child episodes generated by the parallel expansion processing unit 14h, and performs the above processing again. By this means, the third calculation unit 14i can try to calculate minimum occurrences of all child episodes generated by the parallel expansion processing unit 14h.

In addition, there are child episodes minimum occurrences of which are not able to be calculated by the third calculation unit 14i. Being not able to calculate a minimum occurrence means that this child episode does not occur in an event pattern indicated by the event data 13a. Hence, in the present example, so-called "pruning" of stopping generating a new child episode using as a parent a child episode a minimum occurrence of which is not calculated.

Figure 12:
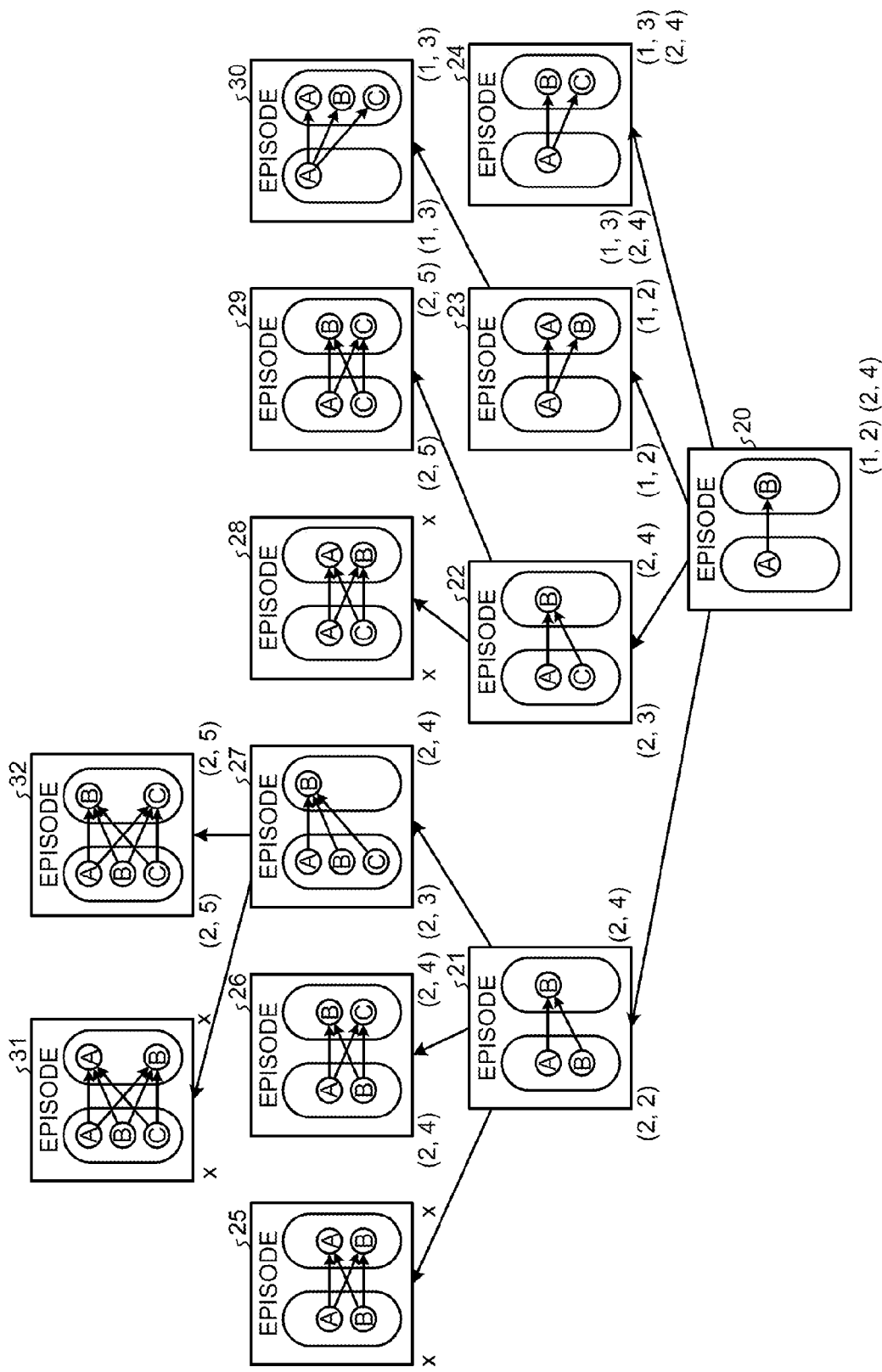
FIG. 12 is a view for explaining an example of processing executed by the extracting device according to the embodiment.

Here, when each of the above processing is repeatedly performed on the parent episode 20 in the example in FIG. 4, each episode and the minimum occurrence are calculated as illustrated in FIG. 12.

The control unit 14 is an integrated circuit such as an ASIC (Application Specific Integrated Circuit) or a FPGA (Field Programmable Gate Array) or an electronic circuit such as a CPU (Central Processing Unit) or a MPU (Micro Processing Unit).

Processing Flow

Figure 13:
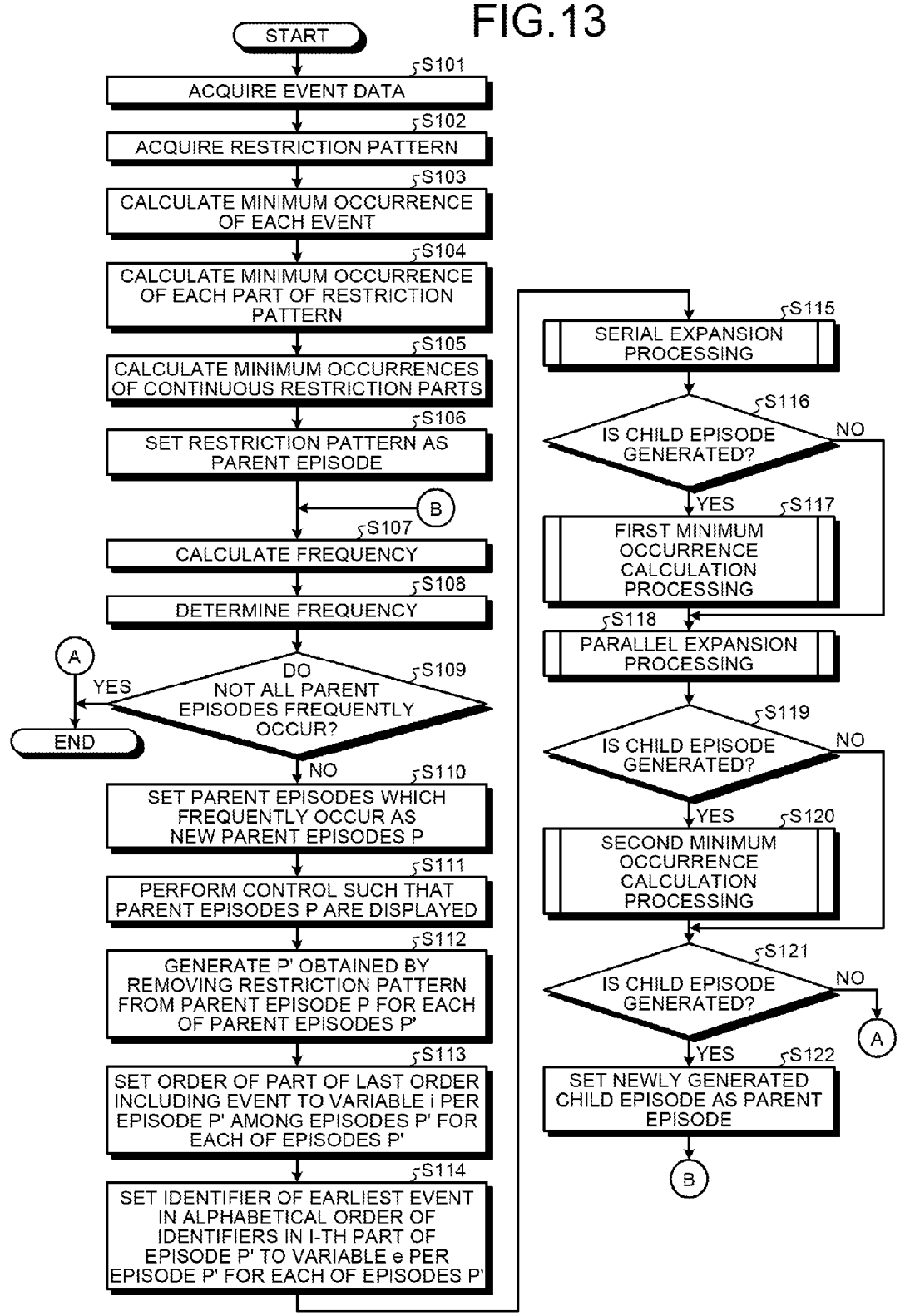
FIG. 13 is a flowchart illustrating processes of extraction processing according to an embodiment.

Next, a processing flow of the extracting device 10 according to the present embodiment will be described. FIG. 13 is a flowchart illustrating process of extraction processing according to an embodiment. A timing to execute this extraction processing may be various timings. When, for example, a command to execute extraction processing is inputted from the input unit 11, the extraction processing is executed by the control unit 14.

As illustrated in FIG. 13, the acquisition unit 14a acquires the event data 13a from the storage unit 13 (S101). Further, the acquisition unit 14a acquires the restriction pattern 13b from the storage unit 13 (S102).

Furthermore, the first calculation unit 14b calculates minimum occurrences of all events which occur in the event pattern indicated by the event data 13a (S103). Still further, the first calculation unit 14b calculates the minimum occurrence of each part of the restriction pattern 13b (S104).

Moreover, the first calculation unit 14b calculates the minimum occurrences of continuous parts including the last part of the restriction pattern 13b (S105). Then, the setting unit 14e sets the restriction pattern 13b to a first parent, that is, a root of an enumeration tree (S106). Subsequently, the extracting unit 14c calculates a frequency of a parent episode such as the above binary frequency per parent episode newly set by the setting unit 14e and per episode which is set as a parent episode (S107). Further, the extraction unit 14c determines whether or not all parent episodes frequently occur by determining whether or not the calculated frequency is "1" (S108). In addition, when the frequency calculated in S107 is the above "window frequency" or "non-overlapping minimum occurrence frequency", in S108, the extraction unit 14c determines whether or not parent episodes frequently occur by determining whether or not the calculated frequency is a predetermined threshold or more. Then, the extraction unit 14c determines whether or not all parent episodes do not frequently occur (S109). When all parent episodes do not frequently occur (Yes in S109), processing is finished.

Meanwhile, when at least one of the parent episodes frequently occurs (No in S109), the setting unit 14e sets the parent episode which frequently occurs as the new parent episode P (S110). Further, the display control unit 14d controls display of the display unit 12 to display the new parent episode P (S111).

Subsequently, the episode P' obtained by removing the restriction pattern 13b from the parent episode P is generated for each of the new parent episodes P (S112).

Then, the setting unit 14e sets for each of the episodes P' the order of a part of the last order including an event among the episodes P' to the variable i per episode P' (S113). Subsequently, the setting unit 14e sets for each of the episodes P' an identifier of an event the identifier of which is the earliest in the alphabetical order in the I-th part of the episode P', to the variable e per episode P' (S114).

The serial expansion processing unit 14f executes serial expansion processing (S115). The second calculation unit 14g determines whether or not the serial expansion processing unit 14f newly generates a child episode (S116). When a new child episode is not newly generated (No in S116), the flow proceeds to S118. When a child episode is newly generated (Yes in S116), the second calculation unit 14g executes first minimum occurrence calculation processing (S117).

The parallel expansion processing unit 14h executes parallel expansion processing (S118). The third calculation unit 14i determines whether or not the parallel expansion processing unit 14h newly generates a child episode (S119). When a child episode is not newly generated (No in S119), the flow proceeds to S121. When a child episode is newly generated (Yes in S119), the third calculation unit 14i executes second minimum occurrence calculation processing (S120).

Further, the setting unit 14e determines whether or not child episodes are newly generated by serial expansion processing executed by the serial expansion processing unit 14f and parallel expansion processing executed by the parallel expansion processing unit 14h (S121). When child episodes are newly generated (Yes in S121), the setting unit 14e sets the newly generated child episodes as parent episodes (S122), and the flow returns to S107. Meanwhile, when child episodes are not newly generated (No in S121), processing is finished.

Figure 14:
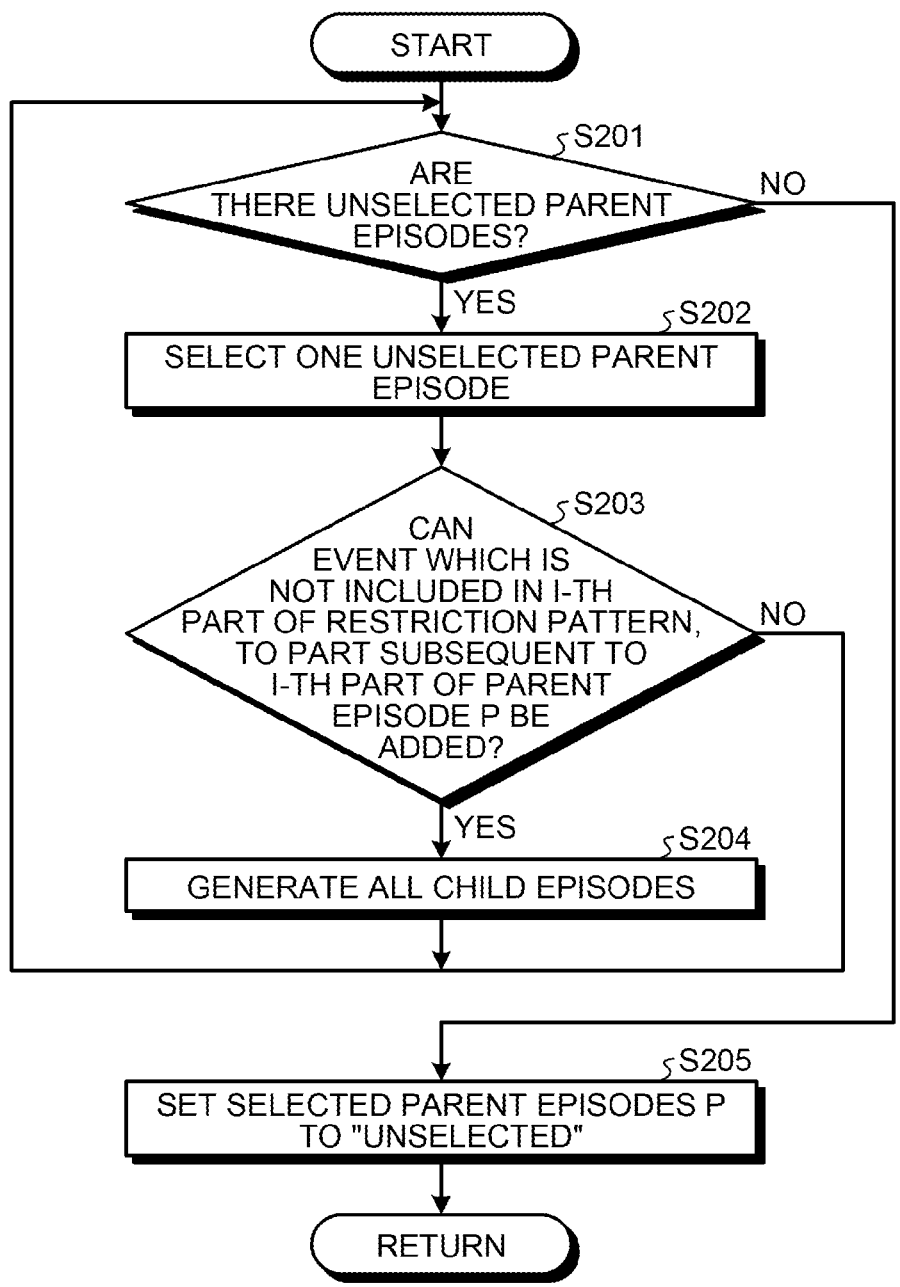
FIG. 14 is a flowchart illustrating processes of serial expansion processing according to an embodiment.

Next, serial expansion processing will be described with reference to FIG. 14. FIG. 14 is a flowchart illustrating process of serial expansion processing according to an embodiment. As illustrated in FIG. 14, the serial expansion processing unit 14f determines whether or not there are the unselected parent episodes P among the new parent episodes P (S201). When there are the unselected parent episodes P (Yes in S201), the serial expansion processing unit 14f selects one unselected parent episode P (S202).

Further, the serial expansion processing unit 14f determines whether or not an event which is not included in a part of the same order of the restriction pattern 13b can be added to a part subsequent to the I-th part in the selected parent episode P (S203). When determining that the event can be added (Yes in S203), the serial expansion processing unit 14f generates all child episodes by adding events which are not included in a part of the same order of the restriction pattern 13b to parts subsequent to the I-th part of the selected parent episode P (S204), and the flow returns to S201. Meanwhile, when there is no unselected parent episode P (No in S201), all selected parent episodes are set to unselected (S205), a processing result is stored in the internal memory and the flow returns.

Figure 15:
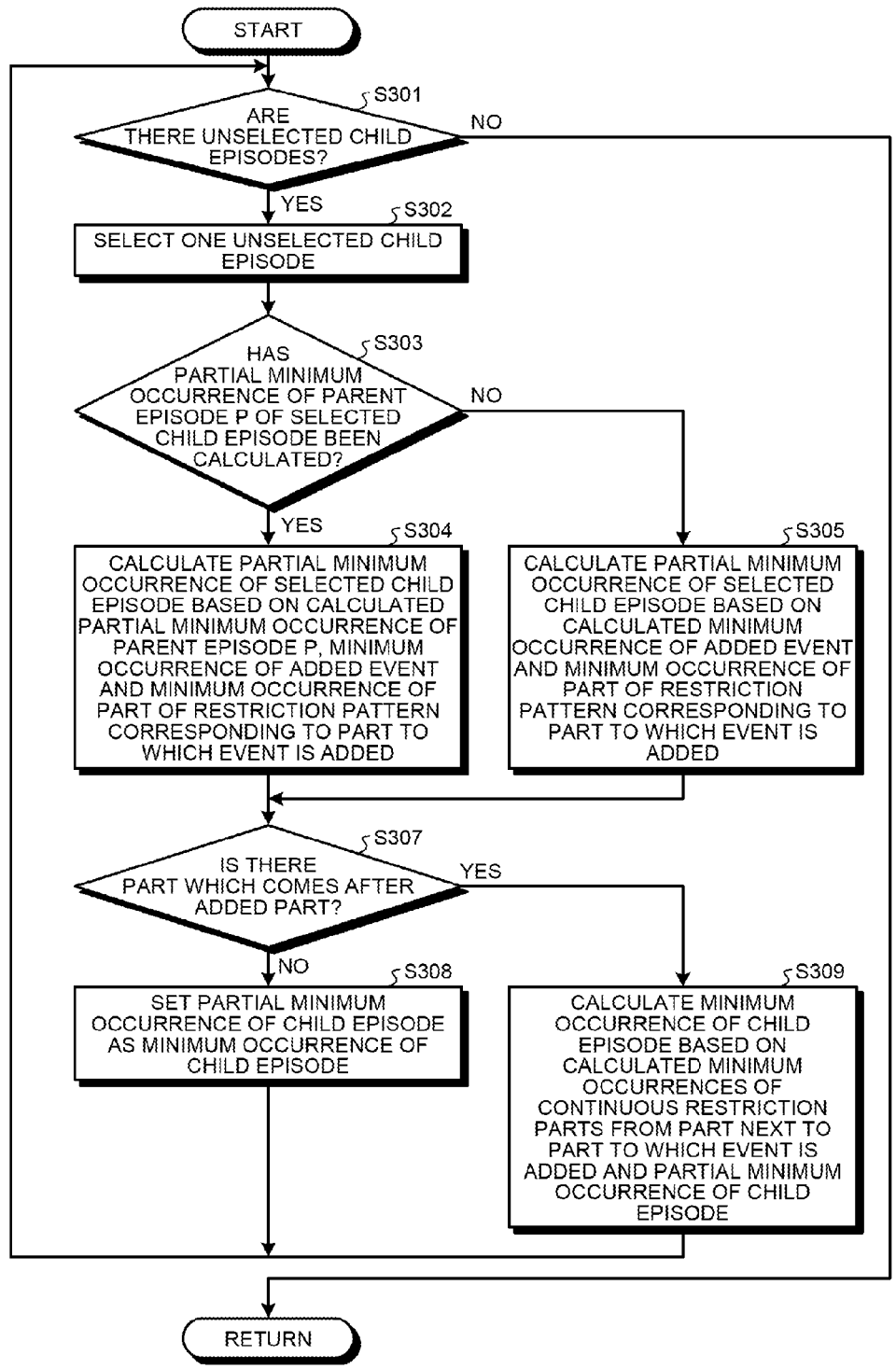
FIG. 15 is a flowchart illustrating processes of first minimum occurrence calculation processing according to an embodiment.

Next, first minimum occurrence calculation processing will be described with reference to FIG. 15. FIG. 15 is a flowchart illustrating process of first minimum occurrence calculation processing according to an embodiment. As illustrated in FIG. 15, the second calculation unit 14g first determines whether or not there is an unselected child episode among the child episodes generated by the serial expansion processing unit 14f (S301). When there is no unselected child episode (No in S301), a processing result is stored in the internal memory, and the flow returns. Meanwhile, when there are the unselected child episodes P (Yes in S301), one unselected child episode is selected (S302). Further, the second calculation unit 14g determines whether or not a partial minimum occurrence of the parent episode P of the selected child episode has already been calculated (S303).

When the partial minimum occurrence of the parent episode P is not yet calculated (No in S303), the second calculation unit 14g performs the following processing. That is, the second calculation unit 14g calculates a partial minimum occurrence of a child episode based on a minimum occurrence of an event added upon generation of the selected child episode and a minimum occurrence of a part of the restriction pattern 13b corresponding to a part to which this event is added (S305).

Further, the second calculation unit 14g determines whether or not there is a part subsequent to a part to which an event is added upon generation of a selected child episode (S307). When there is a part subsequent to a part to which an event is added upon generation of a selected child episode (Yes in S307), the second calculation unit 14g performs the following processing. That is, the second calculation unit 14g calculates a minimum occurrence of the selected child episode based on minimum occurrences and partial minimum occurrences of continuous restriction parts corresponding to a part next to a part to which an event is added to a last part (S309), and the flow returns to S301.

When there is no part subsequent to a part to which an event is added upon generation of a selected child episode (No in S307), the second calculation unit 14g performs the following processing. That is, the second calculation unit 14g calculates a partial minimum occurrence of the selected child episode as a minimum occurrence of a child episode (S308), and the flow returns to S301.

Further, when the minimum occurrence is calculated (Yes in S303), the second calculation unit 14g performs the following processing. That is, the second calculation unit 14g calculates a partial minimum occurrence based on a partial minimum occurrence of the parent episode P, a minimum occurrence of an event added upon generation of the selected child episode and a minimum occurrence of a part of the restriction pattern 13b corresponding to a part to which this event is added (S304). This partial minimum occurrence is a partial minimum occurrence of a child episode. Further, the second calculation unit 14g proceeds to S307.

Figure 16:
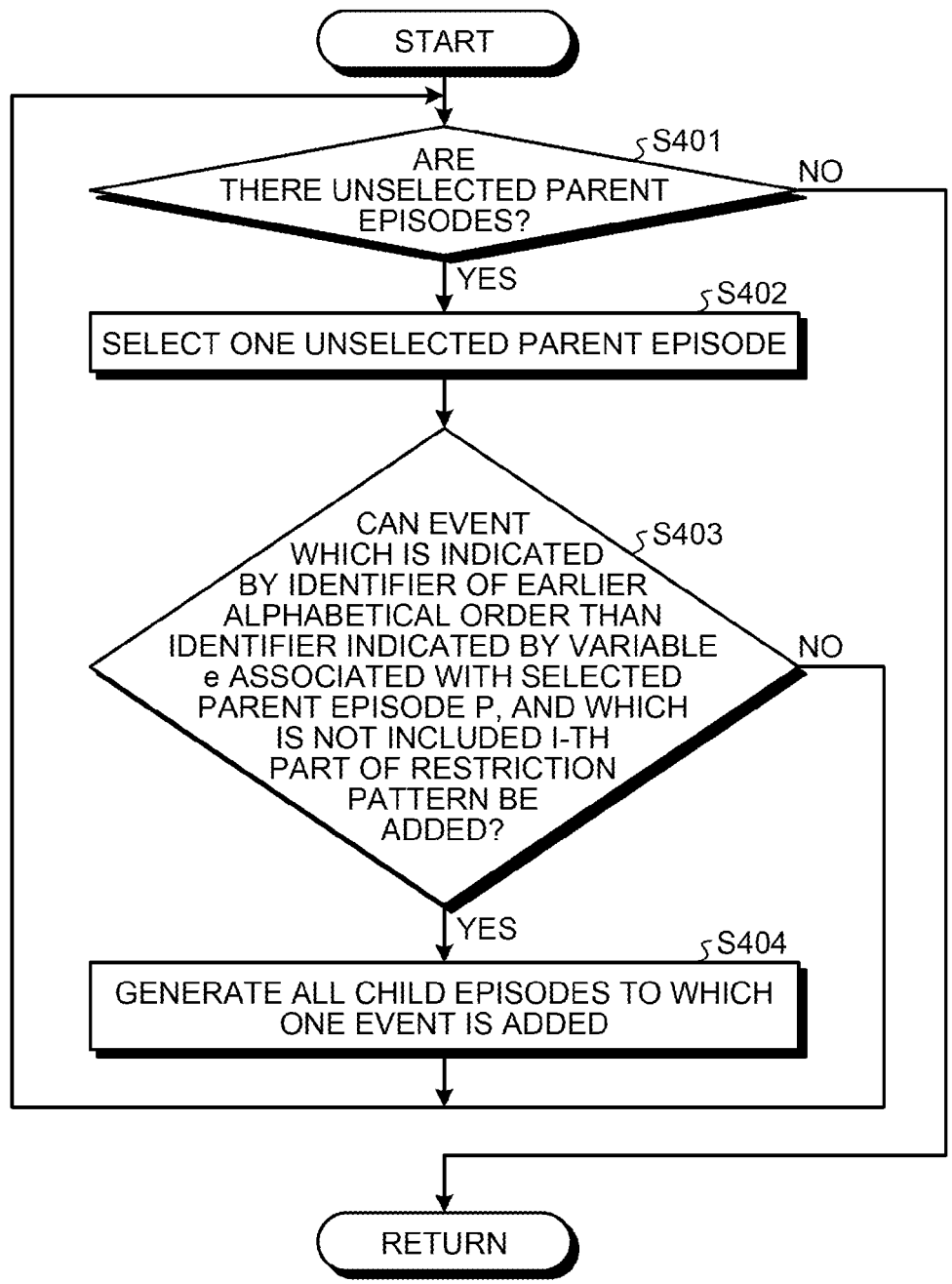
FIG. 16 is a flowchart illustrating processes of parallel expansion processing according to an embodiment.

Next, parallel expansion processing will be described with reference to FIG. 16. FIG. 16 is a flowchart illustrating process of parallel expansion processing according to an embodiment. As illustrated in FIG. 16, the parallel expansion processing unit 14h determines whether or not there are the unselected parent episodes P among the new parent episodes P (S401). When there is no unselected child episode (No in S401), a processing result is stored in the internal memory, and the flow returns. Meanwhile, when there are the unselected parent episodes P (Yes in S401), the parallel expansion processing unit 14h selects one unselected parent episode P (S402).

Further, the parallel expansion processing unit 14h determines whether or not the following event can be added to the I-th part of the selected parent episode P. That is, the parallel expansion processing unit 14h determines whether or not an event which is indicated by an earlier identifier in the alphabetical order than the identifier indicated by the variable e associated with the selected parent episode P and which is not included in the I-th part of the restriction pattern 13b can be added (S403).

When the event is not able to be added (No in S403), the flow returns to S401. Meanwhile, when the event can be added (Yes in S403), the parallel expansion processing unit 14h generates all child episodes by adding all events which are determined to be able to be added, one by one to the I-th part of the selected parent episode P (S404), and the flow returns to S401.

Figure 17:
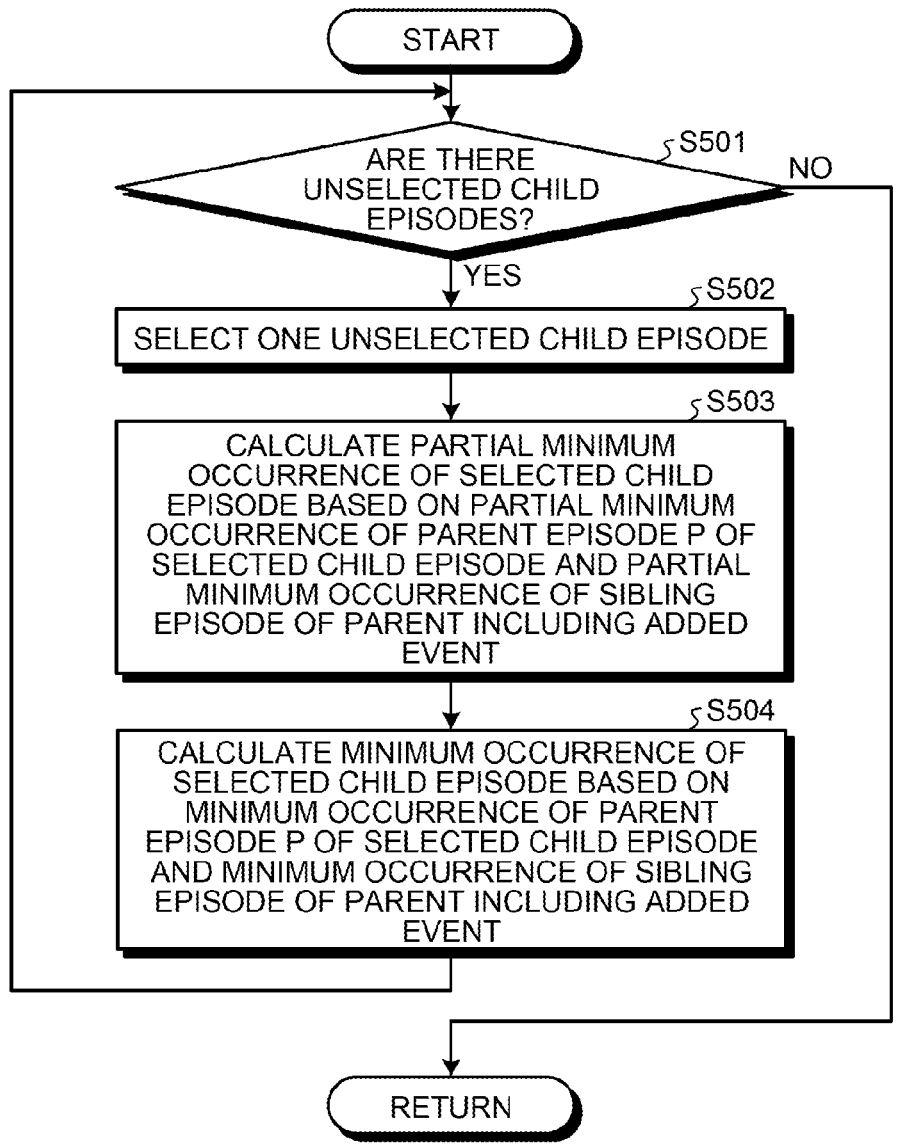
FIG. 17 is a flowchart illustrating processes of second minimum occurrence calculation processing according to an embodiment.

Next, second minimum occurrence calculation processing will be described with reference to FIG. 17. FIG. 17 is a flowchart illustrating process of second minimum occurrence calculation processing according to an embodiment. As illustrated in FIG. 17, the third calculation unit 14i first determines whether or not there are unselected child episodes among the child episodes generated by the parallel expansion processing unit 14h (S501). When there is no unselected child episode (No in S501), a processing result is stored in the internal memory, and the flow returns. When there are the unselected child episodes P (Yes in S501), the parallel expansion processing unit 14h selects one unselected child episode (S502). Further, the third calculation unit 14i performs the following processing based on a partial minimum occurrence of the parent episode P of the selected child episode and a partial minimum occurrence of a sibling episode of the parent which includes in the same part the event added upon generation of the selected episode. That is, the third calculation unit 14i calculates a partial minimum occurrence of the selected child episode (S503). Further, the third calculation unit 14i performs the following processing based on the minimum occurrence of the parent episode P of a selected child episode and the minimum occurrence of a sibling episode of the parent which includes in the same part an event added upon generation of the selected child episode. That is, the third calculation unit 14i calculates a minimum occurrence of the selected child episode (S504). Further, the third calculation unit 14i returns the flow to S501.

As described above, the extracting device 10 according to the present embodiment sets the restriction pattern 13b to a parent upon start of creation of an enumeration tree. Hence, the extracting device 10 according to the present embodiment generates a pattern including the restriction pattern 13b as a child episode. Consequently, the extracting device 10 according to the present embodiment prevents a child episode which is not extracted from being generated and, consequently, can efficiently extract a pattern including a predetermined pattern.

Further, the extracting device 10 according to the present embodiment calculates a minimum occurrence of a child episode without accessing the event data 13a and, consequently, can easily calculate the minimum occurrence of the child episode.

Furthermore, the extracting device 10 according to the present embodiment performs processing using a minimum occurrence which occurs in an event pattern indicated by the event data 13a stored in the internal memory, a minimum occurrence of each part of the restriction pattern 13b and minimum occurrences of continuous restriction parts. That is, the extracting device 10 calculates the minimum occurrence of the child episode. Consequently, it is possible to more easily calculate a minimum occurrence of a child episode.

Although the embodiment related to the disclosed device has been described, the present invention may be implemented in various different modes other than the above embodiment. Hence, other embodiments included in the present invention will be described.

Figure 18:
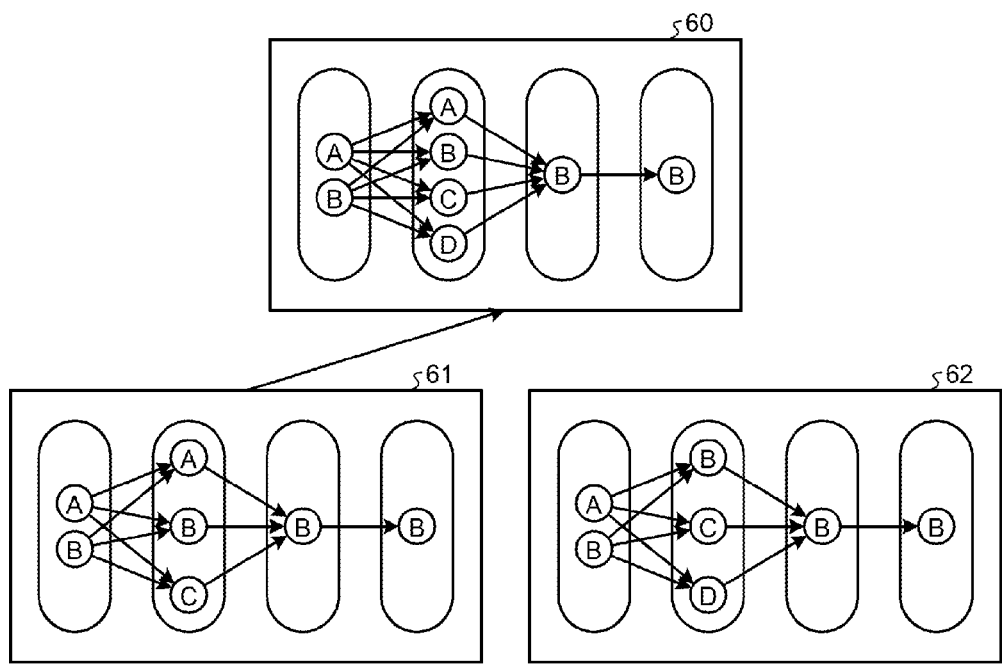
FIG. 18 is a view for explaining an example of processing executed by an extracting device according to a modified example.

A modified example of the disclosed device will be described. For example, the third calculation unit 14i can calculates a minimum occurrence as follows. FIG. 18 is a view for explaining an example of processing executed by an extracting device according to the modified example. FIG. 18 illustrates an example where a child episode 60 is generated by adding an event D to a second part of a parent episode 61. Further, FIG. 18 illustrates an example where a sibling episode 62 of the parent episode 61 including the event D to the second part.

In the example in FIG. 18, when calculating a minimum occurrence of the child episode 60, the third calculation unit 14i first calculates a partial minimum occurrence of the child episode 60 based on a partial minimum occurrence of the parent episode 61 and the sibling episode 62 of the parent. Further, the third calculation unit 14i calculates minimum occurrences of a part next to the second part to which the event D is added upon calculation of the child episode 60 and the last part, and corresponding minimum occurrences of continuous restriction parts stored in the internal memory. Furthermore, the third calculation unit 14i calculates the minimum occurrence of the child episode 60 based on the calculated partial minimum occurrences and minimum occurrences. By this means, a minimum occurrence of a child episode is calculated without accessing the event data 13a, so that it is possible to easily calculate a minimum occurrence of a child episode.

Further, cases have been described with the above embodiment and modified example where the disclosed device generates a child episode by executing serial expansion processing and parallel expansion processing with respect to a parent episode, and repeatedly calculating the generated child episode as a new parent episode. That is, the case has been described with, for example, the above embodiment where a child episode is generated by way of so-called breadth first. However, the disclosed device is not limited to this. For example, while generating an offspring episode of one parent episode, the disclosed device can calculate a minimum occurrence of each part in the same way as the above processing. Further, the disclosed device can finish processing with respect to all offspring episodes of one parent episode, and then perform the same processing on other parent episodes. That is, the disclosed device can generate child episodes by way of so-called depth first, and calculate minimum occurrences.

Further, all or part of processing which is described to be automatically performed among each processing described in the embodiment may be manually performed.

Further, processing in each step of each processing described in the embodiment can be divided into multiple processing or combined according to various loads or a situation of use. Further, the steps may be skipped.

Furthermore, the order of processing in each step of each processing described in the embodiment can be changed according to various loads or a situation of use.

Still further, each component of the illustrated device is functionally conceptual, and does not necessarily need to be physically formed as illustrated. That is, a specific state of distribution and integration of the device is not limited to the illustrated one, and all or part of the specific state may be configured by function or physical distribution or integration in arbitrary units according to various loads or a situation of use.

Extracting Program

Further, extraction processing of the extracting device 10 can be realized by executing a program prepared in advance by a computer system such as a personal computer or a work station. Hereinafter, an example of a computer which executes an extracting program which has the same function as that of the above extracting device 10 will be described using FIG. 19.

Figure 19:
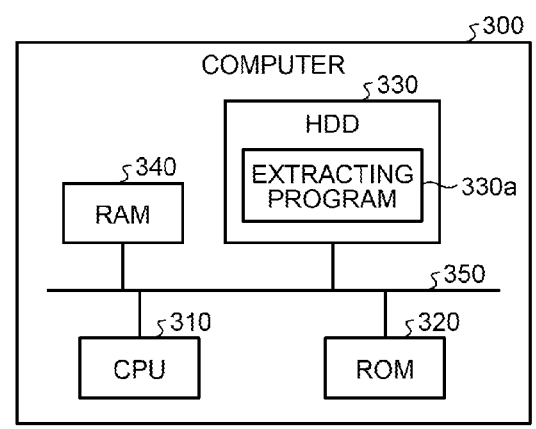
FIG. 19 is a view illustrating a computer which executes an extracting program.

FIG. 19 is a view illustrating the computer which executes the extracting program. As illustrated in FIG. 19, a computer 300 has a CPU (Central Processing Unit) 310, a ROM (Read Only Memory) 320, a HDD (Hard Disk Drive) 330 and a RAM (Random Access Memory) 340. These components 300 to 340 are connected through a bus 350.

In the HDD 330, an extracting program 330*a* which achieves the same functions as the components 14*a* to 14*i* according to the embodiment is stored in advance. In addition, the extracting program 330*a* may be adequately separated.

Further, the CPU 310 reads the extracting program 330*a* from the HDD 330 to execute.

Furthermore, event data and restriction patterns are provided in the HDD 330.

Still further, the CPU 310 reads the event data and the restriction patterns to store in the RAM 340. Moreover, the CPU 310 executes the extracting program using the event data and the restriction patterns stored in the RAM 340. In addition, all items of each data stored in the RAM 340 do not need to be stored in the RAM 340 at all times, and only data of all items of data which is used in processing only needs to be stored in the RAM 340.

In addition, the above extracting program does not necessarily be stored in the HDD 330 from the beginning.

For example, programs are stored in a "portable physical medium" such as a flexible disk (FD), a CD-ROM, a DVD disk, a magnetooptical disk or an IC card to be inserted in the computer 300. Further, the computer 300 may read programs from these media to execute.

Furthermore, the programs are stored in "other computers (or servers)" connected to the computer 300 through a public line, the Internet, a LAN or a WAN. Still further, the computer 300 may read programs from these media to execute.

According to one aspect of an extracting device and an extracting method, it is possible to efficiently extract patterns including a predetermined pattern.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein an extracting program causing a computer to execute a process comprising:
    based on event data obtained by associating a plurality of events stored in a storage unit and an occurrence time of each event, sequentially adding an event to a first pattern obtained by associating the plurality of events and the occurrence order of each event, and sequentially generating a second pattern which includes the first pattern and occurs in the event data; and
    extracting a pattern which satisfies a predetermined condition from the generated second pattern.

2. The non-transitory computer-readable recording medium according to claim 1, wherein the process further comprises:
    calculating the occurrence order associated with a last event of existing events in a pattern obtained by removing the first pattern from the second pattern,
    wherein the sequentially generating the second pattern comprises sequentially adding an event which is not included in events of the first pattern associated with an earlier occurrence order than the calculated occurrence order, to an event of the first pattern which is associated with the earlier occurrence order than the calculated occurrence order, and sequentially generating the second pattern.

3. The non-transitory computer-readable recording medium according to claim 1, wherein the process further comprises:
    specifying an event of an earliest order determined according to a predetermined order rule of the last event in a pattern obtained by removing the first pattern from the second pattern,
    wherein the sequentially generating the second pattern comprises sequentially adding an event which is not included in an event of the first pattern associated with the calculated occurrence order and comprises an earlier order than that of the specified event, to an event of the first pattern which is associated with the calculated occurrence order, and sequentially generating the second pattern.

4. The non-transitory computer-readable recording medium according to claim 2, wherein the process further comprises:
    based on a first time in which events from a top event of a parent pattern of two second patterns which comprise a relationship of a parent and a child to an event of a parent pattern associated with the occurrence order associated with an event added upon generation of the parent pattern occur in the event data, a second time in which an event added upon generation of a child pattern occurs in the event data, and a third time in which the event of the first pattern associated with the occurrence order associated with the event added upon generation of the child pattern occurs in the event data, calculating a fourth time in which events from a top event of the child pattern to an event of the child pattern associated with the occurrence order associated with the event added upon generation of the child pattern occur in the event data; and
    when the event of the child pattern associated with the occurrence order associated with the event added upon generation of the child pattern is a last event of the child pattern, calculating the fourth time as a fifth time in which events from the top event to the last event of the child pattern occur in the event data.

5. The non-transitory computer-readable recording medium according to claim 4, wherein the process further comprises:
    when the event of the child pattern associated with the occurrence order associated with the event added upon generation of the child pattern is not the last event of the child pattern, calculating the fifth time based on the fourth time and a sixth time in which events from an event next to the event of the first pattern associated with the occurrence order associated with the event added upon generation of the child pattern to the last event occur in the event data.

6. The non-transitory computer-readable recording medium according to claim 2, wherein the process further comprises:

based on a first time in which an event added upon generation of a child pattern of two second patterns which comprise a relationship between a parent and a child occurs in the event data, and a second time in which the event of the first pattern associated with the occurrence order associated with the event added upon generation of the child pattern occurs in the event data, calculating a third time in which events from a top event of the child pattern to the event of the child pattern associated with the occurrence order associated with the event added upon generation of the child pattern occur in the event data; and when the event of the child pattern associated with the occurrence order associated with the event added upon generation of the child pattern is a last event of the child pattern, calculating the third time as a fourth time in which events from the top event to the last event of the child pattern occur in the event data.

7. The non-transitory computer-readable recording medium according to claim 6, wherein the process further comprises:

when the event of the child pattern associated with the occurrence order associated with the event added upon generation of the child pattern is not the last event of the child pattern, calculating the fourth time based on the third time and the fifth time in which events from the event next to the event of the first pattern associated with the occurrence order associated with the event added upon generation of the child pattern to the last event occur in the event data.

8. The non-transitory computer-readable recording medium according to claim 3, wherein the process further comprises:

based on a first time in which events from a top event of a parent pattern of two second patterns which comprise a relationship of a parent and a child to an event of the parent pattern associated with the occurrence order associated with the event added upon generation of the parent pattern, and a second time in which the event added upon generation of the child pattern, and events from a top event of a sibling pattern of the parent associated with the occurrence order associated with the event added upon generation of the child pattern to the event associated the occurrence order occur in the event data, calculating a third time in which events from a top event of the child pattern to the event of the child pattern associated with the occurrence order associated with the event added upon generation of the child pattern occur in the event data;

calculating a fourth time in which events from an event next to the event of the child pattern associated with the occurrence order associated with the event added upon generation of the child pattern to a last event occur in the event data; and calculating a fifth time in which events from the top event to the last event of the child pattern occur in the event data based on the third time and the fourth time.

9. The non-transitory computer-readable recording medium according to claim 3, wherein the process further comprises:

based on a first time in which events from a top event to a last event of a parent pattern of two second patterns which comprise a relationship of a parent and a child occur in the event data, and a second time in which an event added upon generation of a child pattern, and events from a top event of a sibling pattern of the parent associated with the occurrence order associated with the event added upon generation of the child pattern to a last event occur in the event data, calculating a third time in which events from a top event to a last event of the child pattern occurs in the event data.

10. The non-transitory computer-readable recording medium according to claim 4, wherein the second time and the third time are stored in a storage unit in advance, and the calculating the fourth time comprises acquiring the second time and the third time stored in the storage unit, and calculating the fourth time based on the acquired second time and third time and the first time.

11. The non-transitory computer-readable recording medium according to claim 5, wherein the sixth time is stored in a storage unit in advance, and the calculating the fifth time comprises acquiring the sixth time stored in the storage unit, and calculating the fifth time based on the acquired sixth time and the fourth time.

12. The non-transitory computer-readable recording medium according to claim 6, wherein the first time and the second time are stored in a storage unit in advance, and the calculating the third time comprises acquiring the first time and the second time stored in the storage unit, and calculating the third time based on the acquired first time and second time.

13. The non-transitory computer-readable recording medium according to claim 7, wherein the fifth time is stored in a storage unit in advance, and the calculating the fourth time comprises acquiring the fifth time stored in the storage unit, and calculating the fourth time based on the acquired fifth time and the third time.

14. An extracting device comprising:

a processor coupled to a memory, wherein the processor executes a process comprising:

storing, in a storage unit, event data obtained by associating a plurality of events and an occurrence time of each event;

sequentially adding, based on event data obtained by associating the plurality of events stored in the storage unit and the occurrence time of each event, an event to a first pattern obtained by associating the plurality of events and the occurrence order of each event, and sequentially generating a second pattern which includes the first pattern and occurs in the event data; and extracting a pattern which satisfies a predetermined condition from the generated second pattern.

15. An extracting method comprising:

based on event data obtained by associating a plurality of events stored in a storage unit and an occurrence time of each event, sequentially adding an event to a first pattern obtained by associating the plurality of events and the occurrence order of each event, and sequentially generating a second pattern which includes the first pattern and occurs in the event data, using a processor; and extracting a pattern which satisfies a predetermined condition from the generated second pattern, using the processor.

* * * * *